US007424415B2

(12) United States Patent
Vassilev

(10) Patent No.: US 7,424,415 B2
(45) Date of Patent: Sep. 9, 2008

(54) AUTOMATED SYSTEM FOR MODELING FAULTED MULTI-VALUED HORIZONS

(75) Inventor: Apostol Todorov Vassilev, Austin, TX (US)

(73) Assignee: Schlumberger Technology Corporation, Houston, TX (US)

( * ) Notice: Subject to any disclaimer, the term of this patent is extended or adjusted under 35 U.S.C. 154(b) by 521 days.

(21) Appl. No.: 10/480,099

(22) PCT Filed: Jun. 5, 2002

(86) PCT No.: PCT/US02/18095

§ 371 (c)(1),
(2), (4) Date: Dec. 5, 2003

(87) PCT Pub. No.: WO02/099464

PCT Pub. Date: Dec. 12, 2002

(65) Prior Publication Data

US 2004/0193960 A1    Sep. 30, 2004

Related U.S. Application Data

(60) Provisional application No. 60/296,385, filed on Jun. 6, 2001.

(51) Int. Cl.
*G01W 1/00* (2006.01)
*G01V 3/38* (2006.01)
(52) U.S. Cl. .................................. 703/10; 702/3; 702/5
(58) Field of Classification Search .................. 703/10; 702/5, 13, 16; 367/73, 72
See application file for complete search history.

(56) References Cited

U.S. PATENT DOCUMENTS 5,740,342 A   4/1998   Kocberber
6,014,343 A   1/2000   Graf et al.

OTHER PUBLICATIONS

Chambers K T et al: "Geologic modeling, upscaling and simulation of faulted reservoirs using faulted stratigraphic grids" Feb. 14-17, 1999.*
Hoffman, Karen: "Modeling Faults as Surfaces in 3D Space" Oct. 14, 1999.*
A Parrallel Multiblock/Multidomain Approach for Reservoir Simulation, SPE International Society of Petroleum Engineers, SPE 51884, Mary F. Wheeler, et al., Feb. 1999. 16 pages.

(Continued)

*Primary Examiner*—Paul L Rodriguez
*Assistant Examiner*—Nithya Janakiraman
(74) *Attorney, Agent, or Firm*—Osha Liang LLP

(57) ABSTRACT

In a method for modeling a reservoir having a horizon surface with a reverse fault, a volume of the reservoir is partitioned into fault blocks. A bounding surface of each of the fault blocks includes a portion of the reverse fault. The interior of each of the fault blocks includes only single valued horizon surfaces. Horizon data describing the reservoir is partitioned into patches, each patch corresponding to a fault block. A horizon surface patch model is derived from the data patch in the interior of each fault block. The horizon patch model includes an up-thrown or down-thrown fault trace, which defines the intersection of the surface patch with the bounding reverse fault. Continuity constraints are defined to ensure that horizon surface patch models on the opposite sides of the reverse fault coincide outside of the real fault.

65 Claims, 22 Drawing Sheets

OTHER PUBLICATIONS

Geologic Modeling, Upscaling and Simulation of Faulted Reservoirs Using Faulted Stratigraphic Grids, SPE International Society of Petroleum Engineers, SPE 51889, K.T. Chambers, et al., Feb. 1999, 12 pages.

* cited by examiner

REVERSE FAULT 220

STRIKE-SLIP FAULT 230

NORMAL FAULT 210

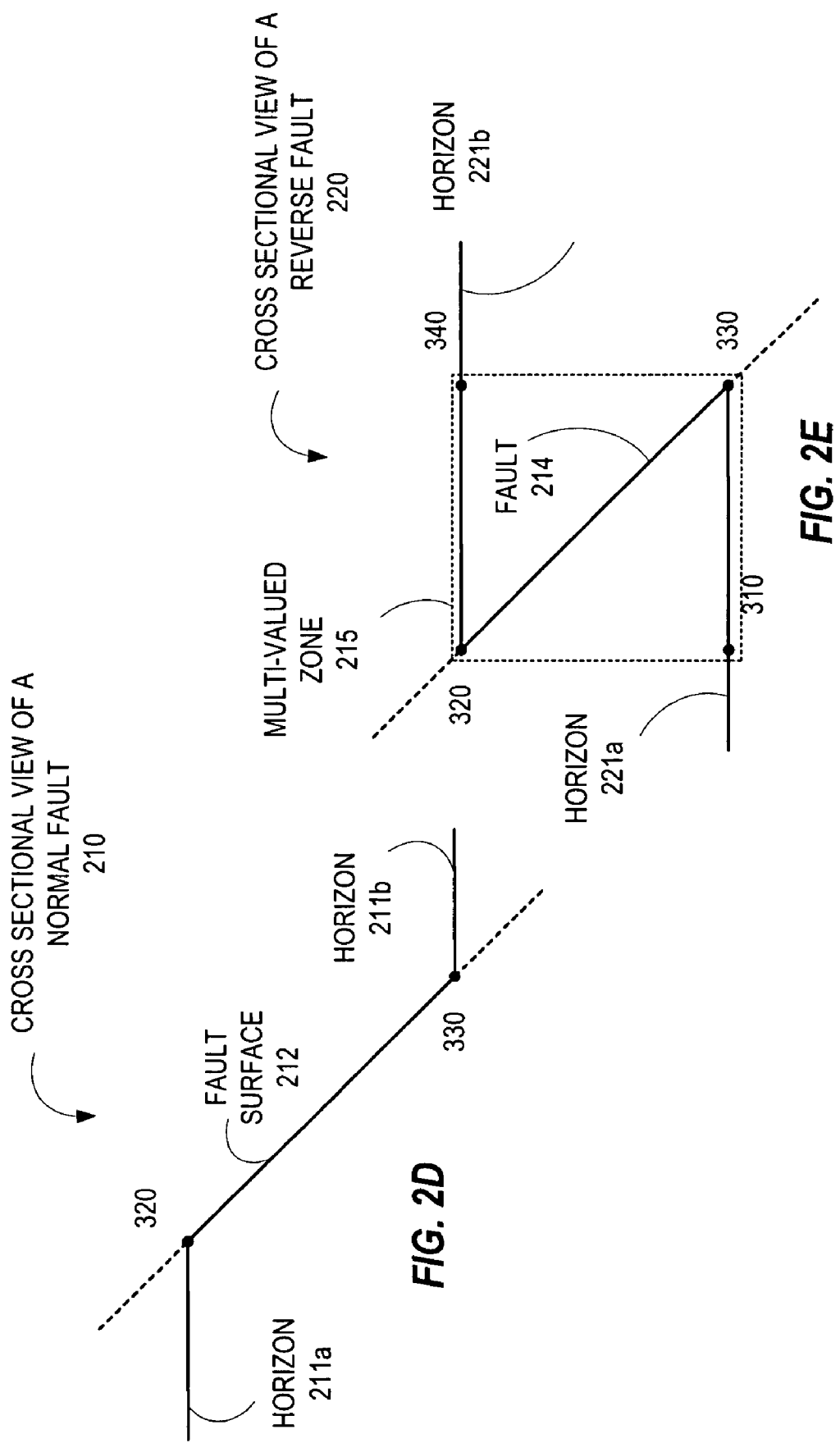

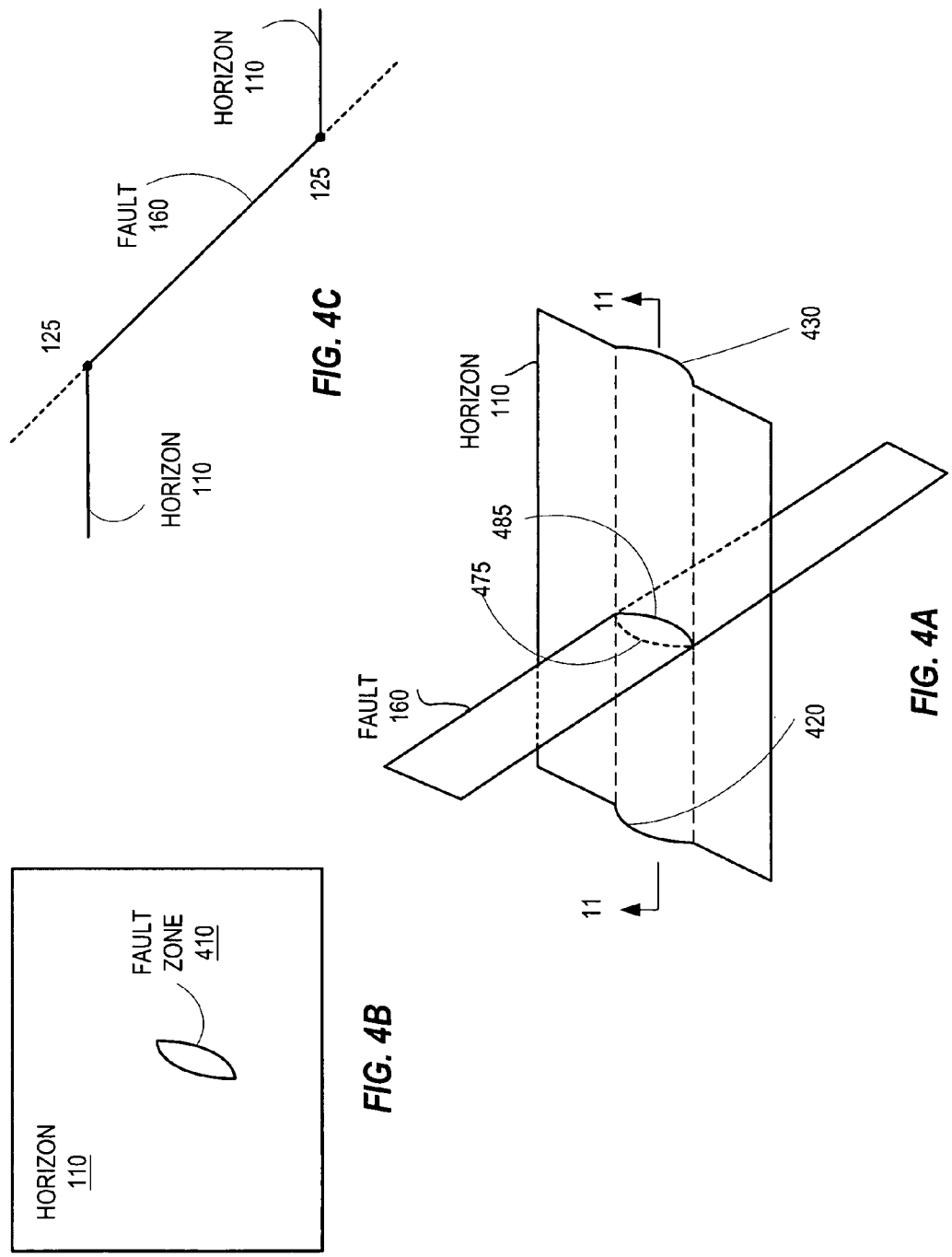

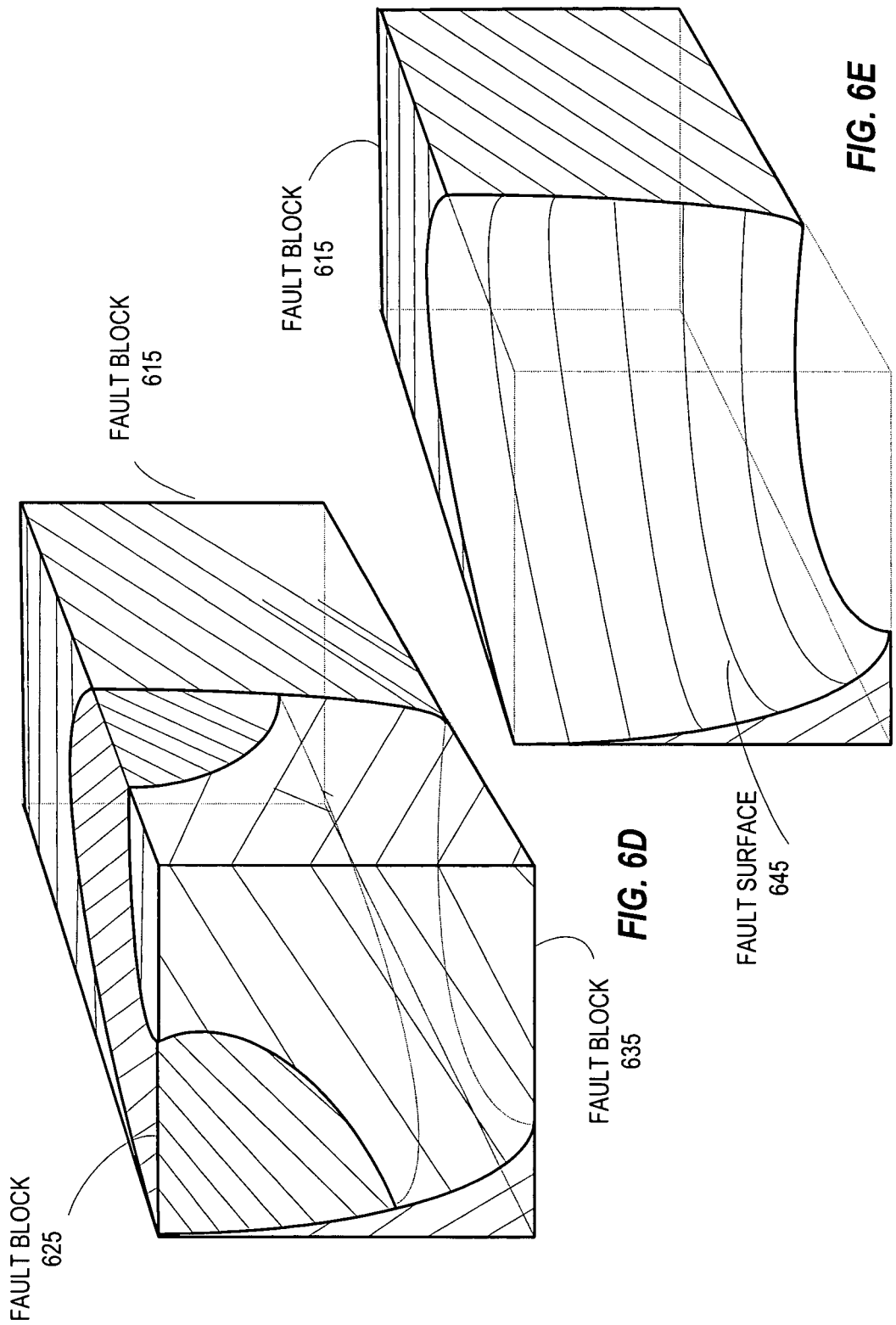

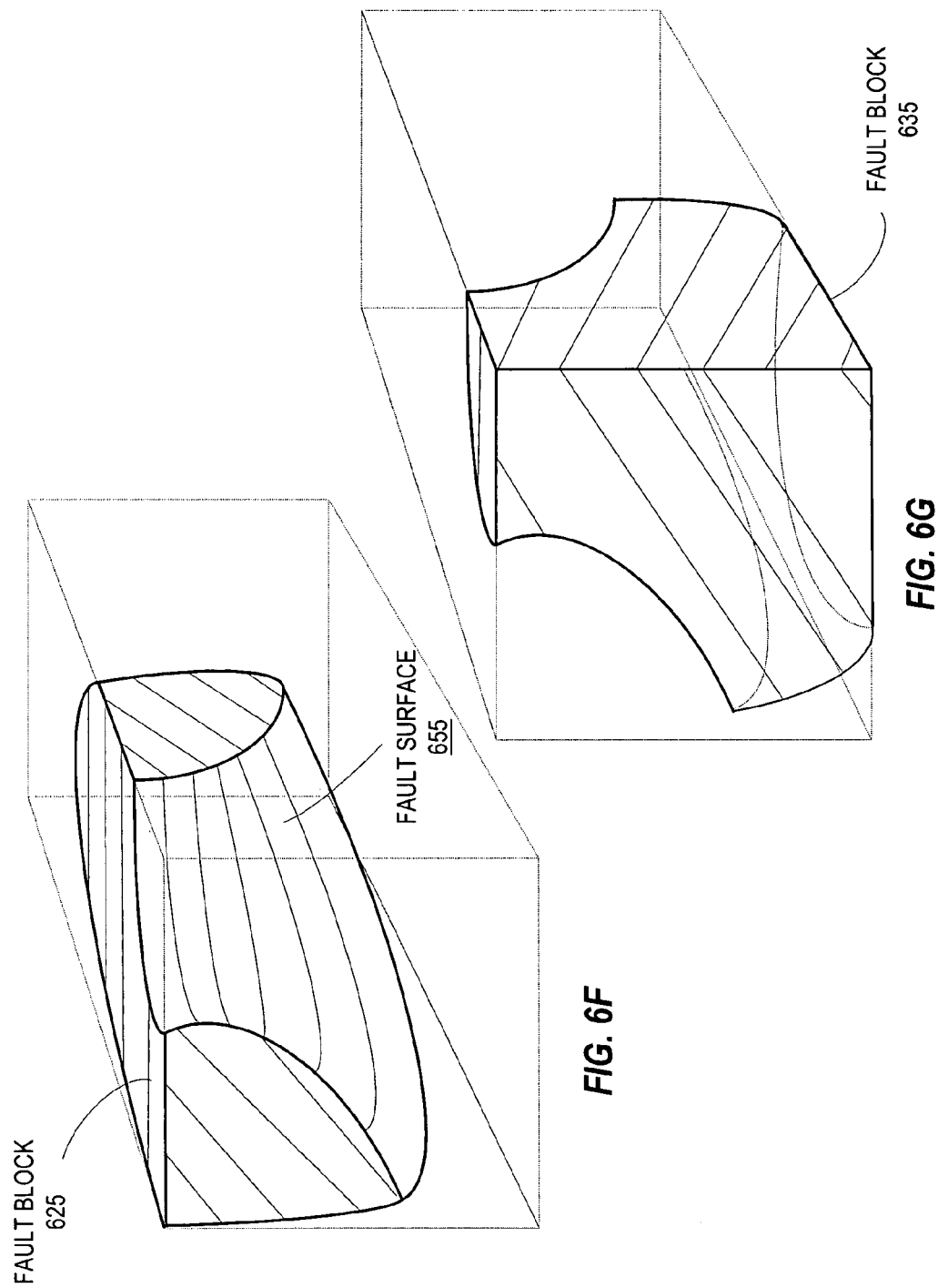

AUTOMATED SYSTEM FOR MODELING FAULTED MULTI-VALUED HORIZONS

CROSS REFERENCE TO RELATED APPLICATIONS

This application claims priority under 33 USC § 119(a) to Patent Cooperation Treaty Application Serial No. PCT/US02/18095 now assigned International Publication No. WO 02/099464 filed Jun. 5, 2002 and entitled "AUTOMATED SYSTEM FOR MODELING FAULTED MULTI-VALUED HORIZONS", which claims the benefit under 35 USC § 119(e) of corresponding Provisional Application Ser. No. 60/296,385 filed Jun. 6, 2001 and entitled "AUTOMATED SYSTEM FOR MODELING FAULTED MULTI-VALUED HORIZONS" the contents of which are hereby incorporated herein in their entirety by reference.

BACKGROUND OF THE INVENTION

1. Field of the Invention

The present invention relates to computer modeling a reservoir having faulted geologic horizons, and more particularly relates to a method, apparatus and computer program product for modeling such a reservoir having at least one reverse fault, and consequently having at least one multi-valued horizon.

2. Related Art

The energy industry is continuously involved with the exploration of underground deposits of hydrocarbons, such as oil and natural gas. In order to cost effectively locate and estimate the amount of hydrocarbon present in such deposits, as well as devise ways to recover them efficiently with the existing technology, the energy industry makes extensive use of computer modeling techniques.

Such modeling techniques are described in further detail in the following U.S. patents, which are hereby incorporated herein by reference into this specification:

1) U.S. Pat. No. 5,982,707, entitled "Method And Apparatus For Determining Geologic Relationships For Intersecting Faults", granted Nov. 9, 1999, William E. Abbott.
2) U.S. Pat. No. 6,014,343, entitled "Automatic Non-Artificially Extended Fault Surface Based Horizon Modeling System", granted Jan. 11, 2000, Graf et al.
3) U.S. Pat. No. 6,138,076, entitled "Automatic Non-Artificially Extended Fault Surface Based Horizon Modeling System", granted Oct. 24, 2000, Graf et al.

Earth formations typically include horizons and faults. It is well known that hydrocarbon deposits tend to be situated adjacent to intersections of these horizons and faults. Previously known modeling techniques were typically capable of handling normal faults but not reverse faults. For example, in a previous technique a reverse fault was treated as if it was a vertical fault, thereby eliminating overlapping horizon surfaces. However, such a simplification reduces the fidelity of the model and increases the error.

In another previously known solution, the hydrocarbon earth reservoir is partitioned into compartments, referred to as blocks, using all faults and artificially extending them to form closed partitioning of the reservoir. However, such techniques lead to unrealistic and complicated computer models thereby compromising the ability to understand the earth formation and derive accurate estimates of the hydrocarbon reserves. Dynamic Graphics' "EarthVision" uses this modeling approach, as an example.

In yet another previously known solution, the modeling technique requires the user to craft the reservoir model by hand. Technoguide's "Petrel" system or Roxar's "IRAP RMS" system uses this modeling technique, as an example. However, such techniques are tedious and time consuming. This technique tends to turn the human into an accessory to the computer by requiring users to interactively construct geometric models, rather than computing the models from the data. Additionally, these techniques are unable to effectively model reservoirs having compound faults.

From the above it should be appreciated that there is an increasing need to have a modeling technique that can handle various types of faults, including reverse faults, and be capable of producing realistic and accurate models. Additionally, it is desirable that the modeling technique support automation thereby requiring very little user interaction.

SUMMARY

The foregoing need is addressed by the present invention. According to one form of the invention, in a method for modeling a reservoir having a horizon surface with a reverse fault, a volume of the reservoir is partitioned into fault blocks. A bounding surface of each of the fault blocks includes a portion of the reverse fault. The geological horizons in the interior of the thus defined fault blocks are represented by single valued surface models. The raw horizon data is partitioned into patches, each patch corresponding to a fault block. The horizon surface patch model is then derived from the data patch in the interior of each fault block. The horizon patch model includes an up-thrown or down-thrown fault trace which defines the intersection of the surface patch with the bounding reverse fault. Continuity constraints are derived automatically to ensure that horizon surface patch models on the opposite sides of a reverse fault coincide along those portions of the fault that do not represent the real geologic fault but are an extension of the true fault model used to partition the volume of the reservoir into well defined closed blocks.

According to another aspect of the invention, a reservoir having horizon surfaces and faults, both reverse and normal, is modeled. In one feature of this method, the fault blocks are partitioned using a subset of all faults in the reservoir, however, the subset includes all the reverse faults. Consequently, each reverse fault is included in a bounding surface of at least one of the fault blocks, and all the partitioned fault blocks have only single valued horizon surfaces.

Other forms, as well as objects and advantages of the invention will become apparent upon reading the following detailed description and upon reference to the accompanying drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 2A, 2B, 2C, 2D and 2E illustrate types of faults that typically occur in an earth formation.

FIGS. 4A, 4B, and 4C illustrate characteristics of an intersection between a fault and a horizon, according to an embodiment of the invention.

FIGS. 6A, 6B, 6C, 6D, 6E, 6F, and 6G illustrate additional aspects of the partitioning of the reservoir into fault blocks, according to an embodiment of the invention.

DETAILED DESCRIPTION OF THE PREFERRED EMBODIMENT

In the following detailed description of the preferred embodiments, reference is made to the accompanying drawings illustrating embodiments in which the invention may be practiced. It should be understood, however, that the drawings and detailed description are not intended to limit the invention to the particular form disclosed, but on the contrary, the intention is to cover all modifications, equivalents and alternatives falling within the spirit and scope of the present invention as defined by the appended claims.

Figure 1:
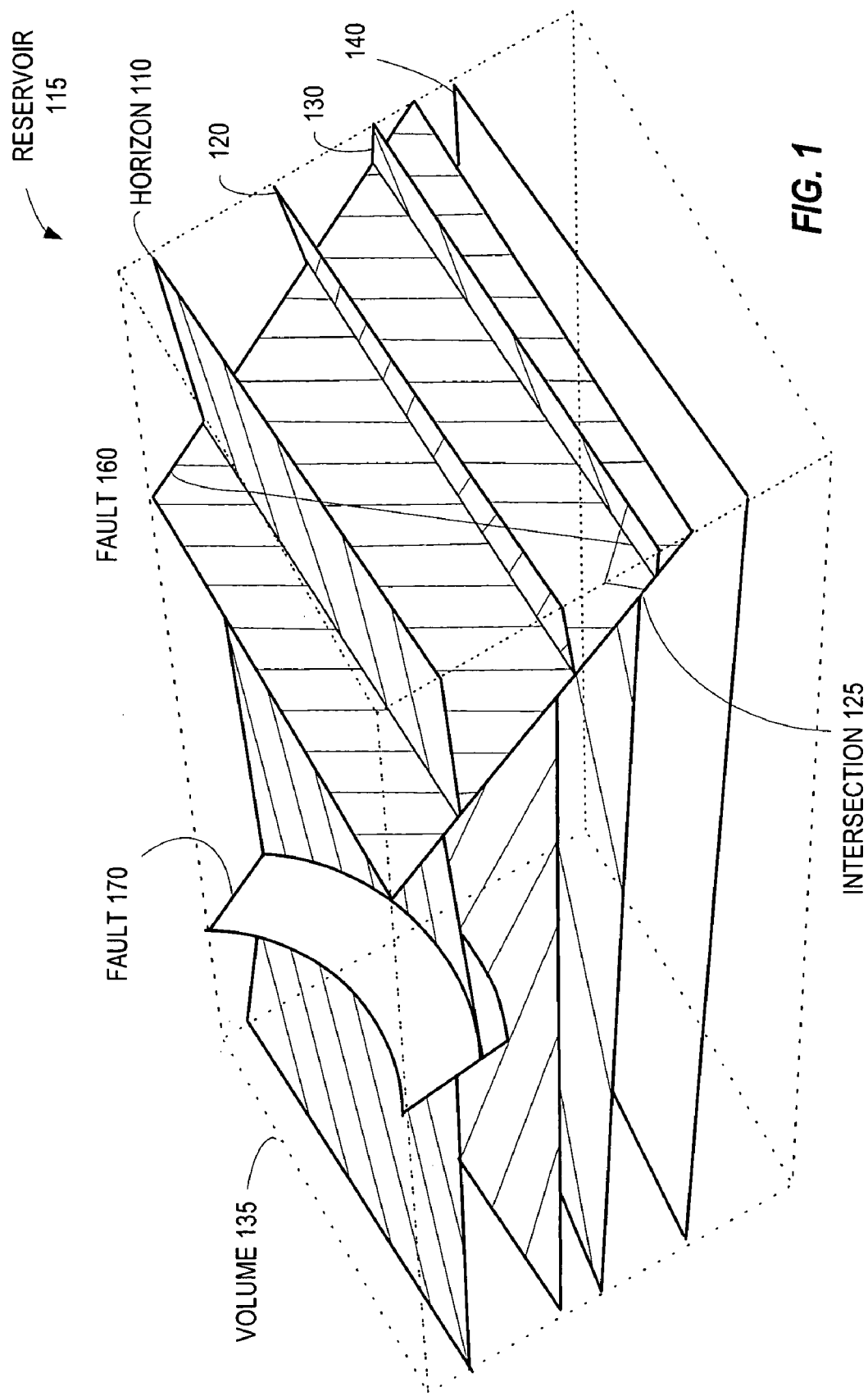
FIG. 1 illustrates a 3D representation of a portion of an earth formation.

Referring to FIG. 1, a 3-dimensional ("3D") representation of a portion of an earth formation, i.e., a reservoir, is illustrated. The portion of the earth formation includes a number of horizons 110, 120, 130, and 140, and faults 160 and 170, which intersect the horizons. Hydrocarbon deposits included in the reservoir 115 tend to be situated adjacent to intersections of horizons and faults, for example, intersection 125 of the horizon 110 with the fault 160. The ultimate purpose of the horizon modeling system of the present invention is to assist a user, e.g., a geophysicist or reservoir engineer, in the task of interpreting input data, e.g., well log and seismic data, to predict optimum locations of underground deposits of hydrocarbon energy stored within the earth formation. The model is typically used to assess the amount of hydrocarbons in the reservoir as well as effective ways to recover them. This analysis is then used in making business decisions about funding the development and management of the reservoir.

The 3D portion of the reservoir 115 is a closed block whose boundary is defined by the fault 160 and portions of the boundary of the whole reservoir. In the illustrated example, the boundary defines a rectangular solid having a volume 135 with dimensions 50 miles long, 20 miles wide and 5 miles deep.

A geologic horizon is the interface between two depositional earth layers. A fault is a break in the earth layer and the adjacent horizon surfaces, across which there is observable displacement.

Figure 2B:
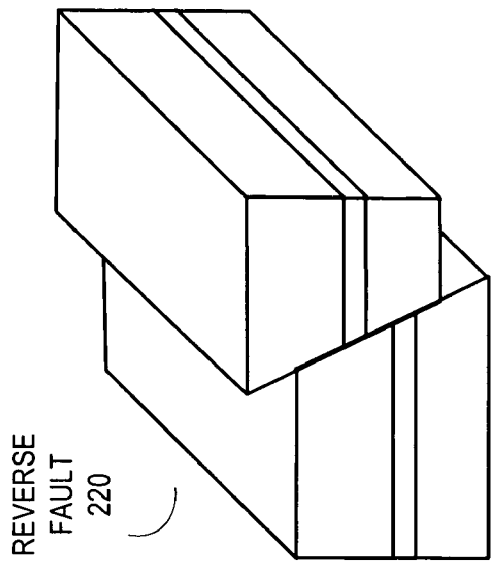
Figure 2C:
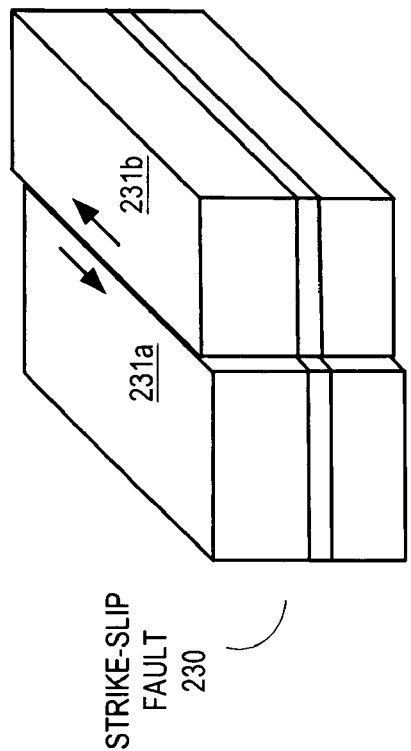
Figure 2A:
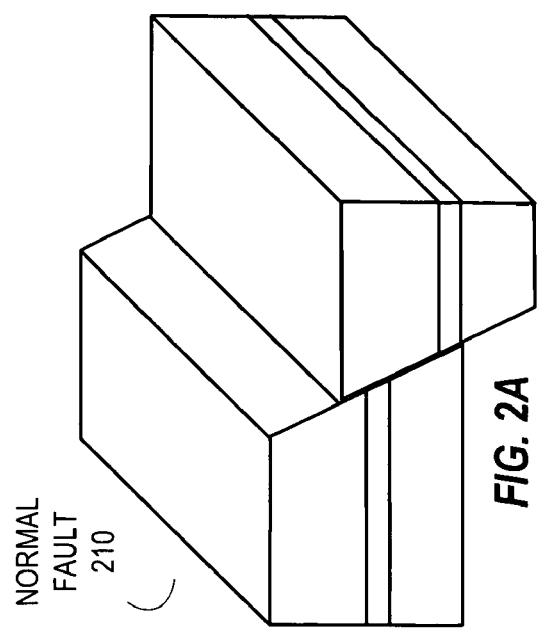

Referring to FIGS. 2A, 2B, 2C, 2D and 2E, various types of faults are illustrated. Since it is likely that hydrocarbon deposits are situated adjacent to the intersections of horizons and faults, determining the location and the type of fault, as well as accurately resolving the geometry of all related geologic features, is important. Depending on the relative direction of displacement between the horizon surfaces, a fault is described as a normal fault 210 shown in FIG. 2A, a reverse fault 220 shown in FIG. 2B, a strike-slip fault 230 shown in FIG. 2C or a mixed fault (not illustrated). For the cross sectional view of the normal fault 210, the horizon surfaces 211a, and b on respective sides of the fault surface 212 do not vertically overlap as shown in FIG. 2D. For the cross sectional view of the reverse fault 220, the horizon surfaces 221 a, and b do overlap vertically as shown in FIG. 2E. The overlap area is referred to as a multi-valued zone 215. For the strike-slip fault 230, the horizon surfaces 231 a, and b are displaced laterally but not vertically. A fault is "mixed" if, in some areas along the fault surface, it is normal and, in others, it is reverse or strike-slip.

Figure 3A:
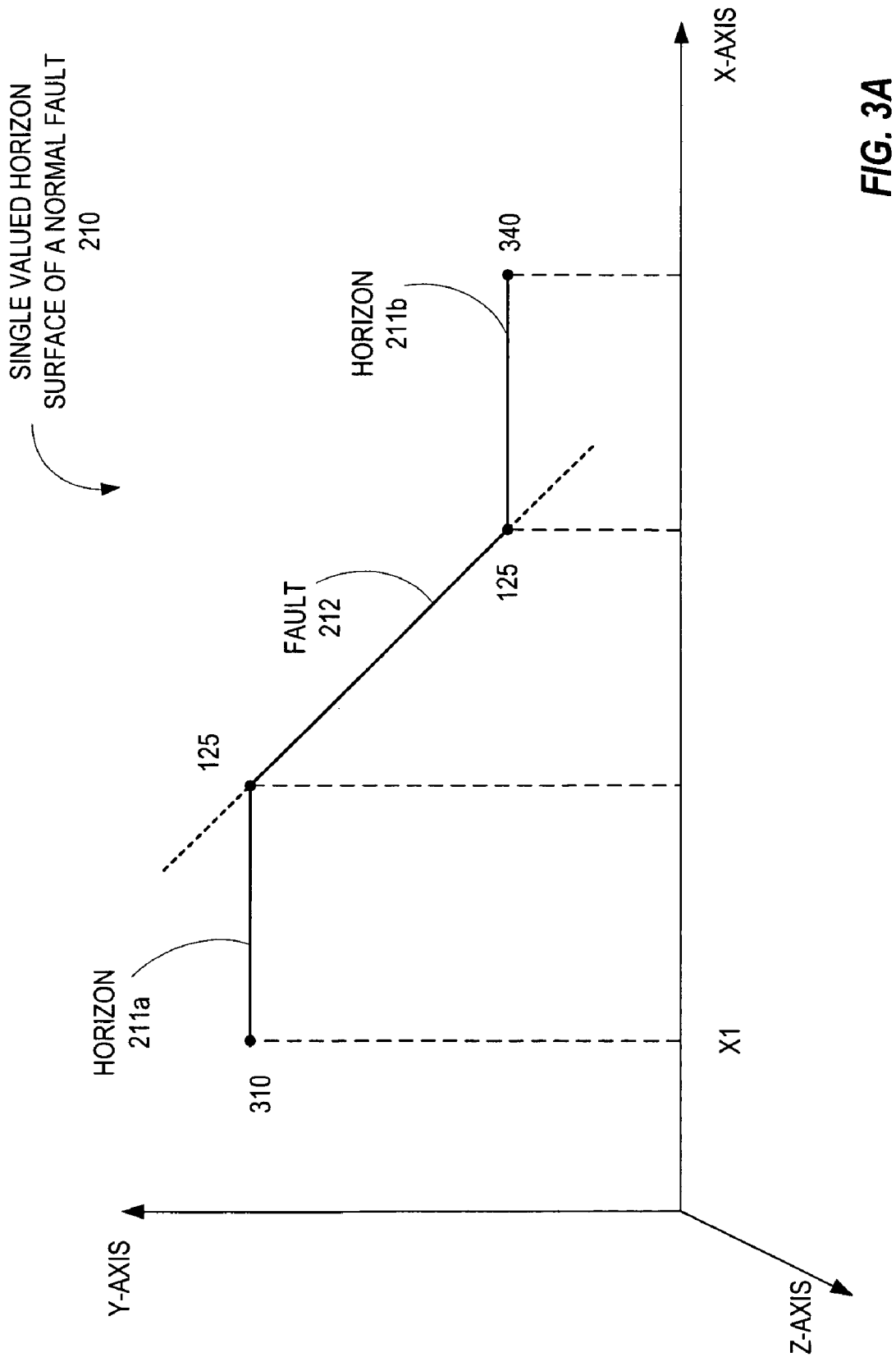
FIGS. 3A, 3B and 3C illustrate single valued and multi-valued horizon surfaces, including aspects of an embodiment of the invention.
Figure 3B:
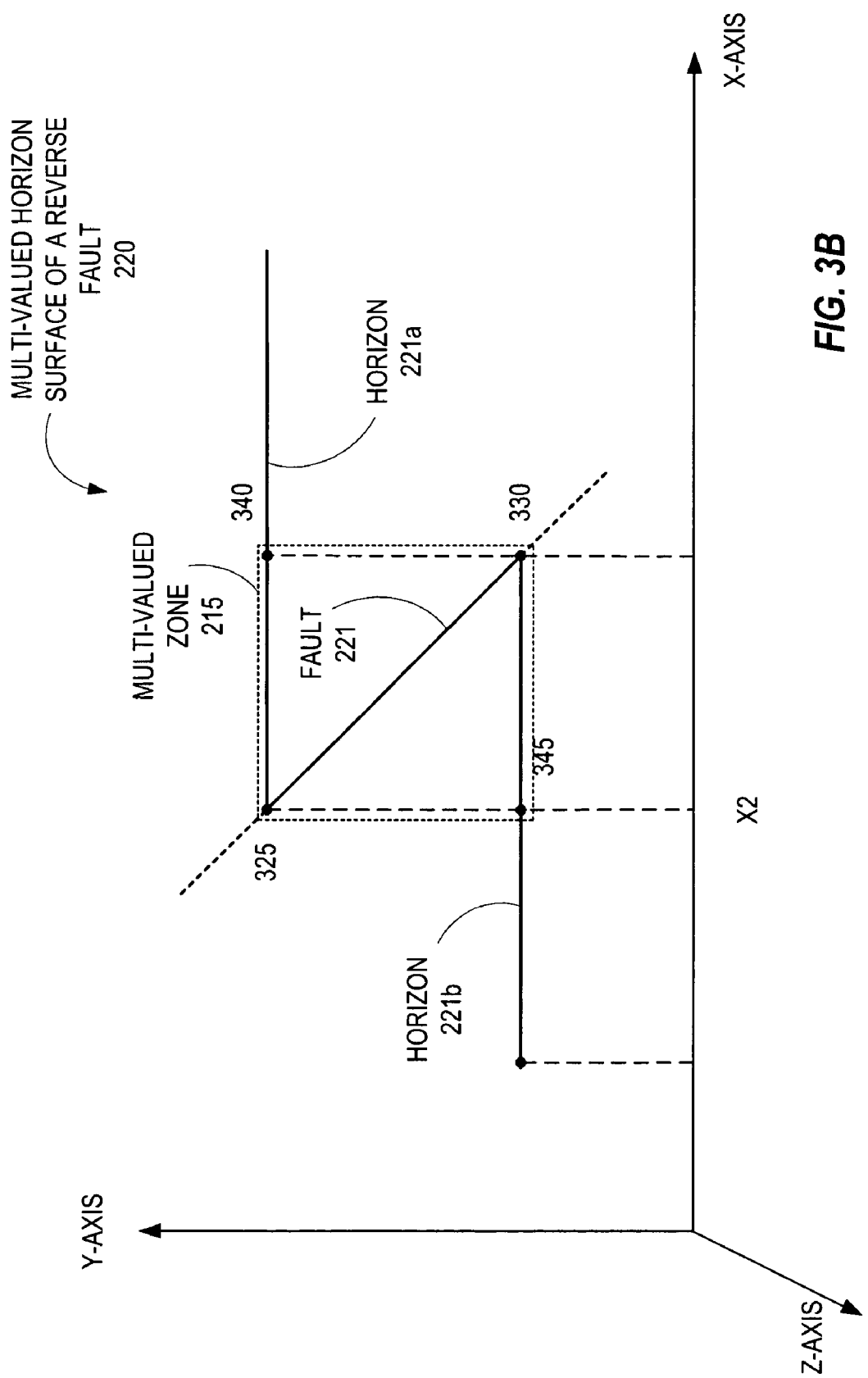
Figure 3C:
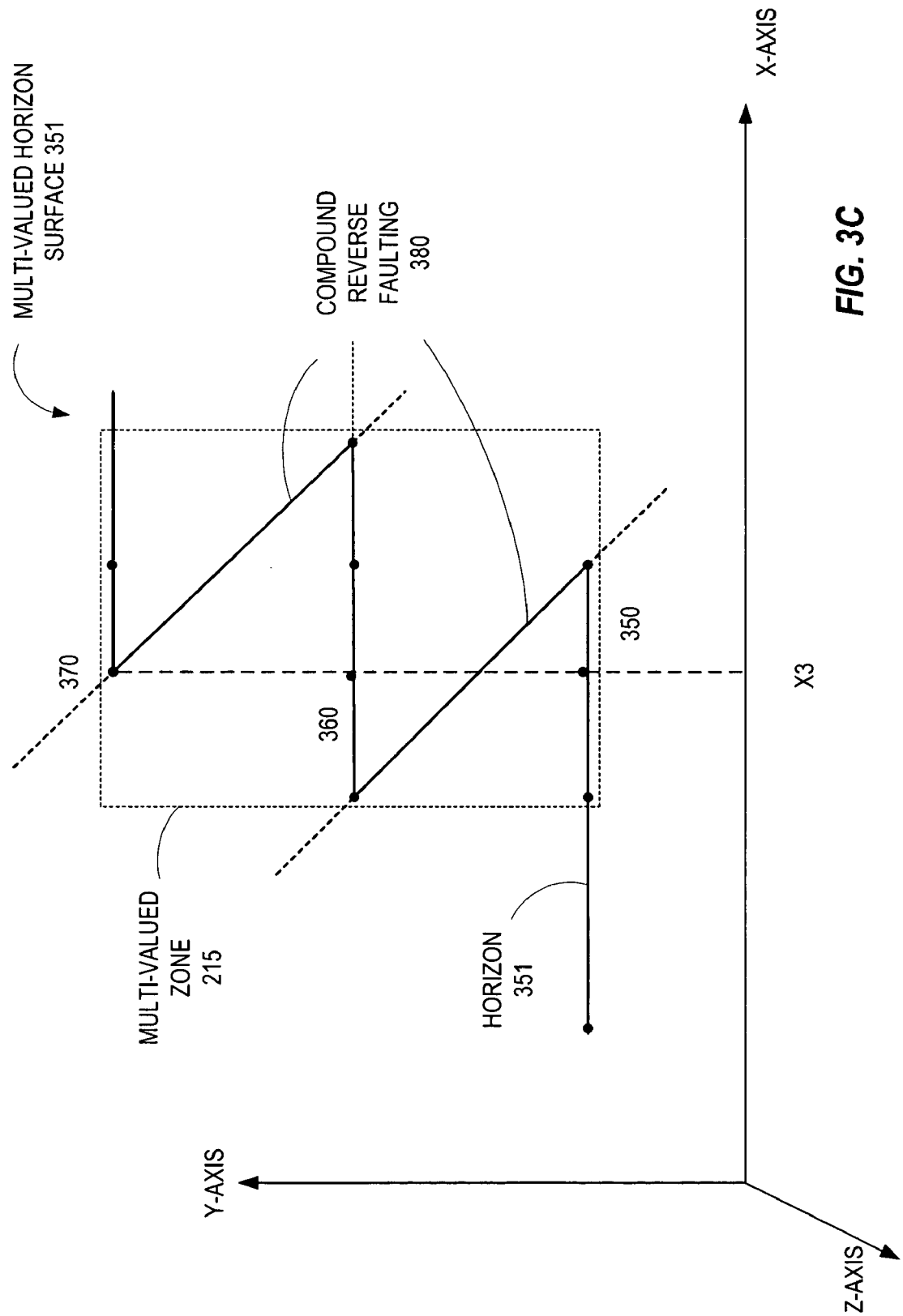

Referring to FIGS. 3A, 3B and 3C, intersections with an x-y plane are illustrated for single valued and multi-valued horizon surfaces 211 and 221 resulting from faults 210 and 220 respectively. FIG. 3A illustrates that normal fault 210 results in the single valued surface 211 in the x-y plane since there is no vertical overlap between the corresponding horizon surfaces. That is, in the x-y plane intersecting the horizon 211 there is one and only one y co-ordinate value. For example, in the x-y plane for a single x co-ordinate x1, there is only one horizon point or grid node 310 of horizon 211a.

FIG. 3B illustrates a multi-valued horizon surface 221 resulting from the reverse fault 220. A zone of a reservoir having multi-valued horizon surfaces is known as the multi-valued zone 215. In the x-y plane intersecting horizon 221, there are multiple horizon points or grid nodes, each grid node being associated with a corresponding horizon surface. For example, for single co-ordinate x2, there are two corresponding grid nodes 325 and 345 of horizon 221. Grid node 325 corresponds to an up-thrown fault trace of the horizon surface 221a and grid node 345 corresponds to a down-thrown fault trace of the horizon surface 221b. Both of these traces will be described further in FIGS. 4A, 4B and 4C below.

The trace of a horizon surface intersecting a fault surface is a one dimensional curve in the 3D Euclidean space. For example, where a planar contact representing a fault surface intersects a flat horizon surface, the trace (map pattern) of the contact is a straight line. If the contact is not planar the trace is a general curve. A fault trace is a curve representing the intersection of the horizon and the fault. The up-thrown and down-thrown fault traces include pairs of up-thrown and down-thrown lines of intersection between the horizon and each fault surface.

FIG. 3C illustrates a multi-valued horizon surface 351 that results from two reverse faults being close to each other, and creating a compound reverse fault. In the case of this compound reverse faulting 380, for a single co-ordinate x3 in the x-y plane shown, there are 3 corresponding grid nodes 350, 360 and 370 that intersect the horizon surface 351.

Referring to FIGS. 4A, 4B and 4C, characteristics of fault traces are illustrated for an intersection between fault 160 and horizon 110 of FIG. 1. A fault zone that includes an up-thrown fault trace 475 down-thrown fault trace 485 is created by the intersection 125 between the fault 160 and the horizon 110.

The fault zone is an opening that is created in the horizon 110 when the fault 160 passes through the horizon 110. The left side of the fault zone is shown to be raised upwardly 420, and a right side that is shown to be lowered downwardly 430. FIG. 4B illustrates a top view of the horizon 110 showing the fault zone 410. FIG. 4C illustrates the side view of the horizon 110 and intersecting fault 160 of FIG. 4A taken along section lines 11-11 of FIG. 4A. Note that the left side of the horizon 110 is raised compared to the right side of the horizon 110.

Figure 5:
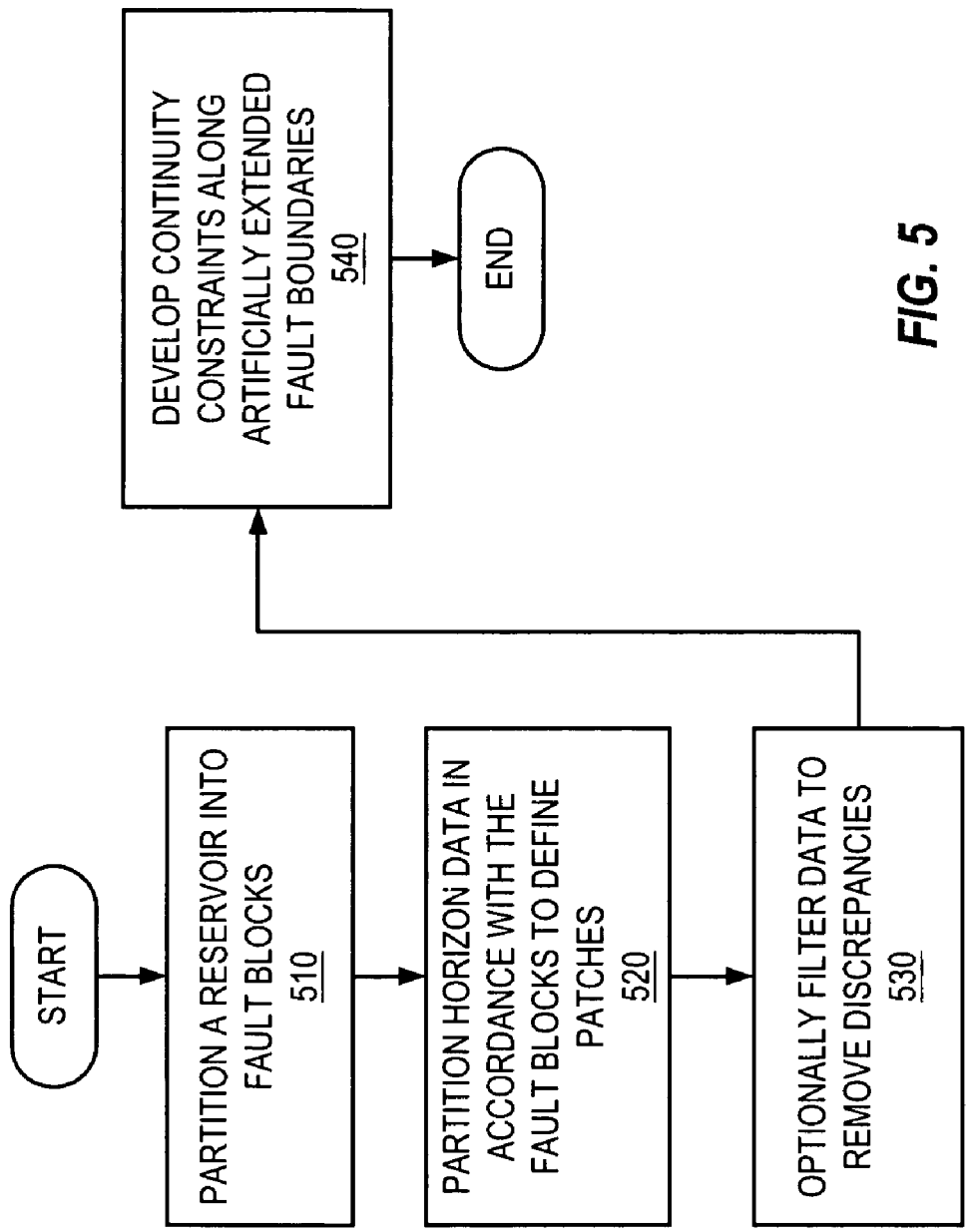
FIG. 5 illustrates a modeling technique for developing a horizon model in a 3D reservoir having at least one reverse fault, according to an embodiment of the invention.

Referring to FIG. 5, a modeling technique for developing a horizon model for the 3D reservoir 115 having at least one reverse fault 220 is illustrated, according to an embodiment of the present invention. The 3D horizon model of the present invention is adapted for receiving horizon surface data, fault surface and relationship data as inputs. Prior art techniques for generating horizon input data, also referred to as "horizon data", are fully described in the U.S. patent references cited previously. Horizon data includes data obtained from activities such as boring a well to gather data samples and conducting seismic surveys to collect seismic data. In addition to horizon data, input requirements include fault surfaces and a description of fault relationships, e.g., names of faults that mutually intersect and their major/minor relationship. Prior art techniques for generating "fault surfaces and relationships" data, e.g., information that describes fault surfaces and fault relationships are also fully described in the U.S. patent references cited previously.

The new modeling technique includes, in step 510, partitioning a reservoir which has multi-valued horizon surfaces into fault blocks. The reservoir may have numerous faults, only some of which are reverse faults. All of the reverse faults are included among the partitions that are selected as boundaries for fault blocks, so that all the partitioned fault blocks have only single valued horizon surfaces, although possibly faulted by normal faults. The partitioned fault blocks having the single valued horizon surfaces are then further developed using prior art techniques that are fully described in the U.S. patent references cited previously.

In step 510, a volume of the reservoir is partitioned into a plurality of fault blocks. In one embodiment, all of the partitions include reverse faults, so that at least one bounding surface of each of the plurality of fault blocks includes a portion of a respective one of the reverse faults. The partitioning process is repeated for each of the additional reverse faults that may be present in the reservoir 115. To reiterate, at the end of the partitioning process, in the interior of each of the plurality of fault blocks the geological horizons are single valued. The partitioning process of step 510 for the reservoir having one reverse fault is described in additional detail in FIGS. 6A and 6B, according to an embodiment of the present invention. The partitioning process of step 510 for the reservoir having a plurality of reverse faults is described in additional detail in FIGS. 6C, 6D, 6E, 6F and 6G, according to an embodiment of the present invention.

In step 520, the horizon data describing the reservoir 115 is partitioned into data sets, with each data set corresponding to the fault blocks generated in step 510. For a given horizon surface, each fault block includes only data points defining the single valued horizon surface model in the interior of the fault block, as described in step 510. A horizon surface within a fault block is known as a "horizon patch" or simply a "patch". That is, for a given horizon, there is at most one horizon patch, possibly faulted, for every fault block, but some of the fault blocks may not have patches. The number of data sets is less than or equal to the number of fault blocks generated by the splitting of the reservoir 115. Each data set corresponds to a horizon patch. The set of all horizon patches constitutes the full horizon model in the reservoir. The formation of the patches per step 520 is described in additional detail in FIG. 7.

In step 530, an optional filtering of data may be performed. The filtering may be needed to remove discrepancies between the input horizon data and the geometry of the fault blocks defined through the splitting faults. The filtering of data per step 530 is described in additional detail in FIG. 8.

In step 540, continuity constraints are developed along artificially extended fault block boundaries to maintain integrity of the horizon surface and its gradient. Specifically, the continuity constraints assure maintaining integrity of continuous horizon surface model and its gradient across artificially extended fault block boundaries used to construct closed fault block partitioning. In one embodiment, the continuity constraints result in matching endpoints of the up-thrown and down-thrown fault trace of the reverse fault. The development of the continuity constraints per step 540 is described in additional detail in FIG. 9, according to one embodiment.

To reiterate, the preceding has described selecting reverse faults for partitioning the reservoir so that all fault blocks in the reservoir have single value horizons. Referring to FIGS. 6A, 6B, 6C, 6D, 6E, 6F and 6G, partitioning of a reservoir into fault blocks, per step 510, is illustrated. The fault block partitioning technique incorporates classical mathematical "partitioning of unity" concept.

Given a framework of surfaces and faults representing the cracks in the reservoir, and the set of input horizon data (typically a cloud of points in the 3D Euclidean space encompassing the volume of the reservoir) as described in earlier cited U.S. patents, a partitioning of the volume of the reservoir into closed sub-volumes is developed. The sub-volumes are usually known as fault blocks. The cracks in the reservoir are not necessarily connected so that the corresponding fault surfaces do not define a closed fault block partitioning. To overcome this, the following procedure to extrapolate, or extend, the fault surface is applied.

A Cartesian coordinate system (x,y,z) for the reservoir and parameterization $Z_F(x,y)$ for a fault surface F is defined, where Z is a continuously differentiable function in the definition domain $D_F(x,y)$ of the fault. The reservoir can be viewed as a closed volume whose surface is the union of surfaces $S_i$, for i=1, . . . , n, for some natural number n. Each surface $S_i$ admits a parameterization $S_i$ in a definition domain $D_{Si}(x,y)$. The original fault surface is extended throughout the reservoir using a well known mathematical procedure for surface extrapolation. The extrapolation, or extension, of the fault surface can be expressed as a new parameterization $Z\hat{}_F$, defined over the entire reservoir, e.g., the union of all $D_{Si}(x,y)$, and such that $Z\hat{}_F(x,y)=Z_F(x,y)$ for every point (x,y) in $D_F(x,y)$. Naturally, $D_F(x,y)$ is a subset of the union of all $D_{Si}(x,y)$.

Figure 6A:
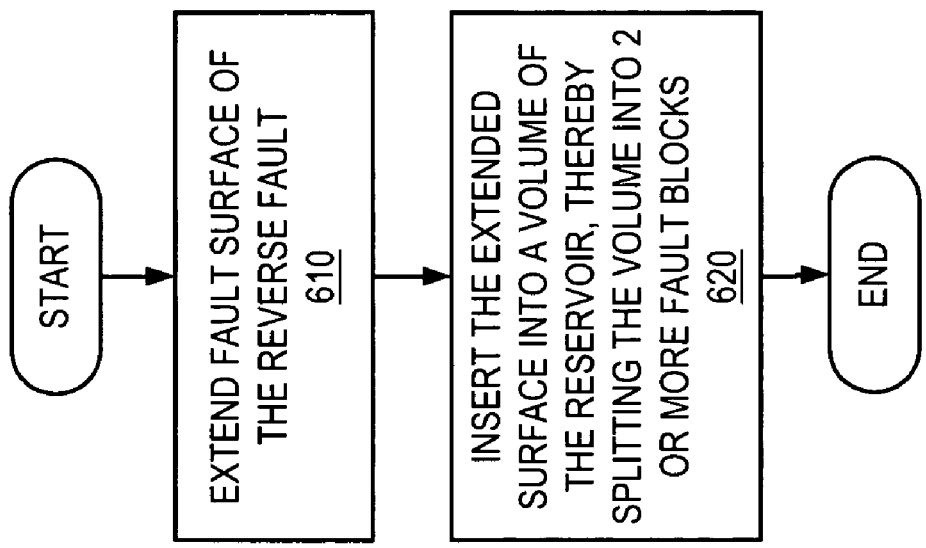

Referring to FIG. 6A, a flow chart for partitioning the reservoir having one reverse fault is illustrated, according to one embodiment. In step 610, the fault surface that includes the reverse fault 220 is artificially extended to intersect the reservoir boundaries. In step 620, the artificially extended fault surface is inserted into the volume 135 of the reservoir thereby splitting or partitioning the volume of the reservoir into at least two fault blocks.

Figure 6B:
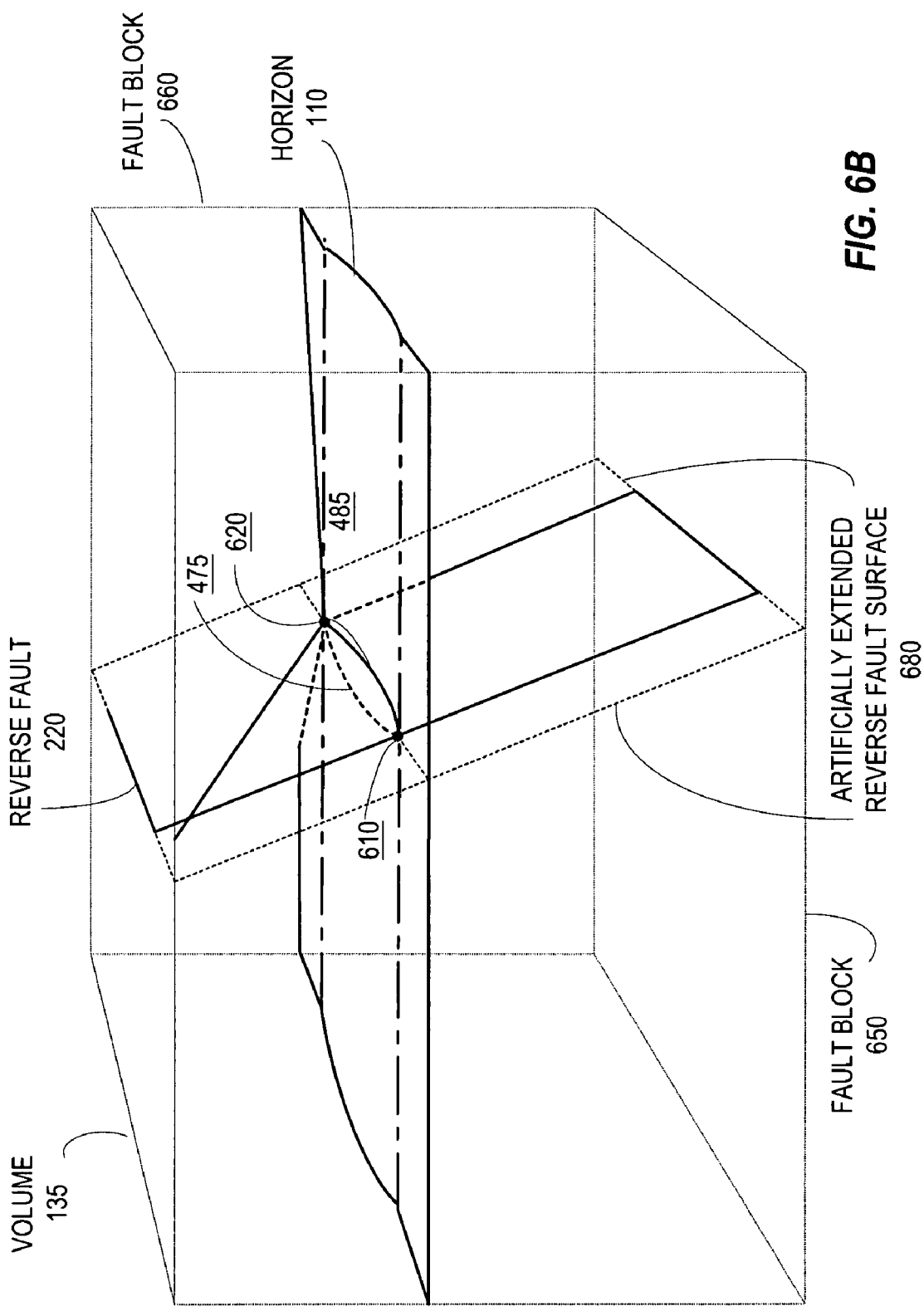

Referring to FIG. 6B, taking the first extrapolated fault $Z\hat{}_F$, e.g., extended fault surface 680, and inserting it in the volume 135 of the reservoir it splits the original volume 135 into two or more closed sub-volumes or fault blocks 650 and 660 as illustrated, according to an embodiment. At least one bounding surface of each of the fault blocks 650 and 660 includes a portion of the reverse fault 220 having end points 610 and 620. The up-thrown fault trace 475 down-thrown fault trace 485 shown includes the end points 610 and 620. In one embodiment, the fault blocks are formed by artificially extending fault surfaces of the reverse fault 220 to an intersection of another horizon with another fault.

Figure 6C:
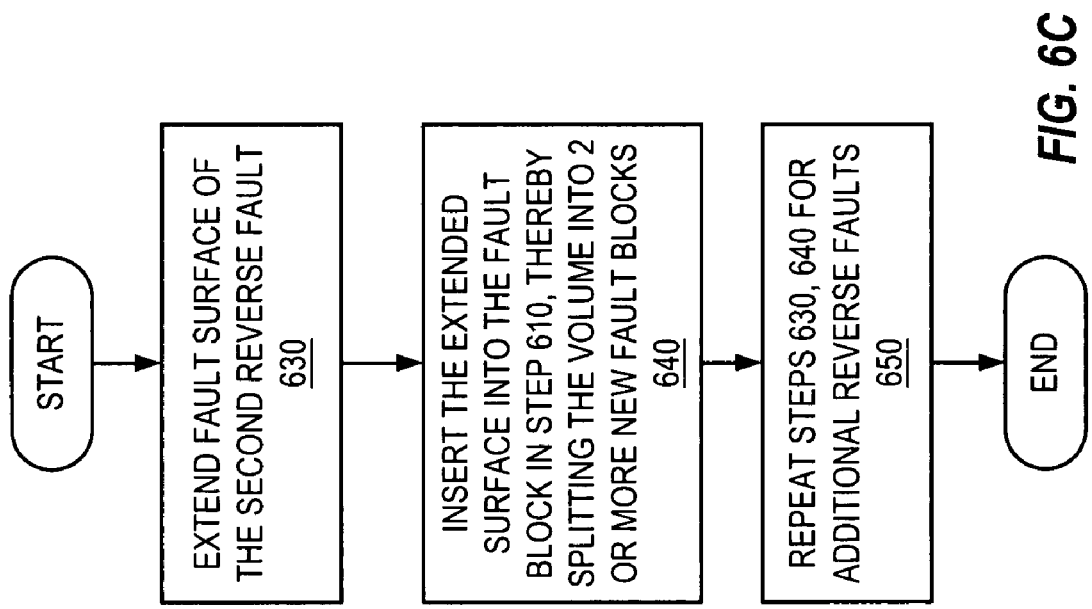

Additional fault blocks are generated for additional reverse faults, when present. Referring to FIG. 6C, a flow chart for partitioning the reservoir having a second reverse fault is illustrated, according to one embodiment. In step 630, the fault surface that includes the second reverse fault is artificially extended to intersect the reservoir boundaries. In step 640, the artificially extended fault surface of the second reverse fault is inserted into the fault block that includes the second reverse fault. The insertion results in splitting or partitioning the volume of the fault block into at least two new fault blocks. In optional step 650, if more than two reverse faults are included in the reservoir then steps 630 and 640 are repeated for each of the additional reverse fault.

FIGS. 6D, 6E, 6F and 6G illustrate the partitioning of the reservoir having two reverse faults included in fault surfaces 645 and 655. Inserting the second reverse fault into any of these new blocks splits it into two or more new fault blocks. Continuing this process until the last extrapolated fault is inserted defines a set of closed fault blocks 615, 625 and 635 whose union is the original reservoir volume 135, as illustrated in FIG. 6D, according to an embodiment. FIG. 6E illustrates closed fault block 615 and fault surface 645 of the reverse fault. FIG. 6F illustrates closed fault block 625 and fault surface 655 of the second reverse fault. FIG. 6G illustrates closed fault block 635. An extrapolated fault splits only the fault block it is inserted into. An extrapolated fault surface may be inserted into more than one fault block if desired.

An important element of fault block partitioning process, per step 510, and as described above is the freedom to form closed fault blocks using only a subset of all faults in the reservoir. For example, a subset may be used that includes only reverse faults, but which includes all the reverse faults in the reservoir. This advantageously allows reverse faults, which are important, to be modeled more accurately than does a model that simplifies reverse faults by treating them as vertical faults. Alternatively, the subset of faults used to partition the reservoir into fault blocks does not have to be limited to reverse faults only. Any number of existing normal faults may be used in the partitioning process described in step 510.

Figure 7A:
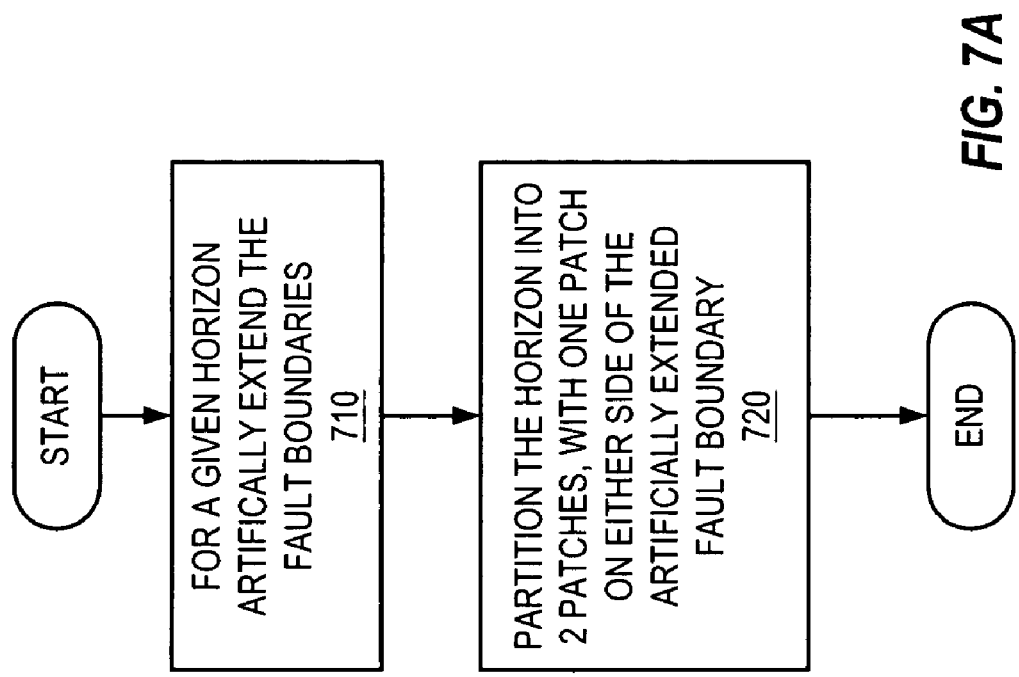
FIGS. 7A, and 7B illustrate formation of the patches, according to an embodiment of the invention.

Referring to FIG. 7A, a flow chart for partitioning the formation of patches is illustrated, according to one embodiment. In step 710, for a given horizon, the fault boundaries are artificially extended. In step 720, the horizon is partitioned into 2 patches by artificially extending the fault boundaries. The two patches are on the opposing sides of the extended fault boundaries.

Figure 7B:
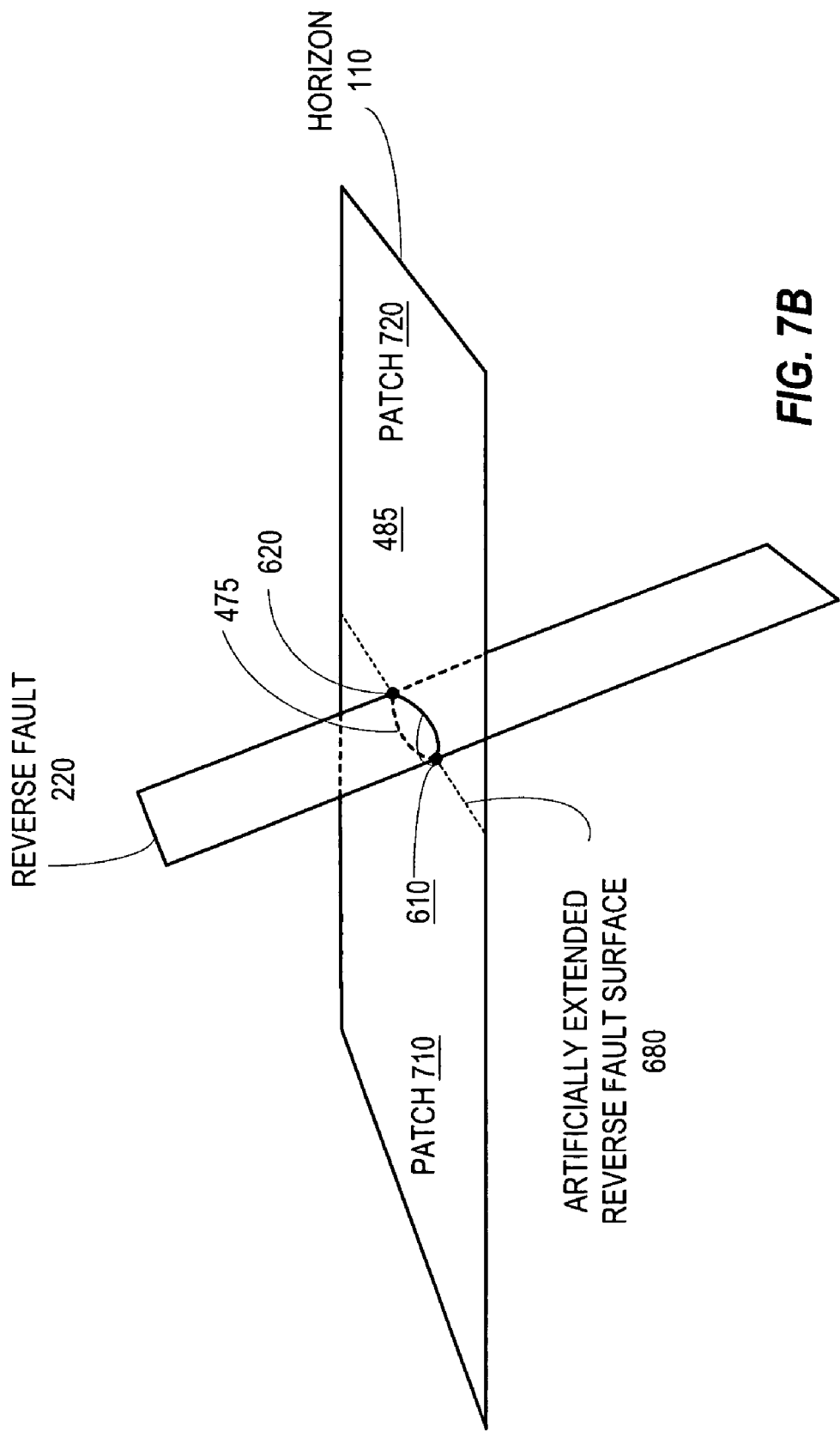

Referring now to FIG. 7B, formation of the patches is illustrated, according to an embodiment. The first step in developing the horizon patches of the horizon data is partitioning of the horizon input data with respect to a set of fault blocks, per step 520, whose union is the entire reservoir. The result from partitioning of the horizon data is a collection of data sets. The number of data sets in this collection is less than or equal to the number of fault blocks generated by the splitting of the reservoir. For a given horizon 110, patches 710 and 720 are formed by artificially extending the fault block boundaries 680 as described in FIG. 6B. The partitioned data sets with each data set corresponding to a horizon patch are then used in the subsequent steps of the modeling algorithm.

The horizon model in the interior of each fault block is represented as a single valued surface. In this way, faulted horizon modeling will be a hybrid technique, allowing both volume splitting and non-splitting faults at the users discretion.

Figure 8:
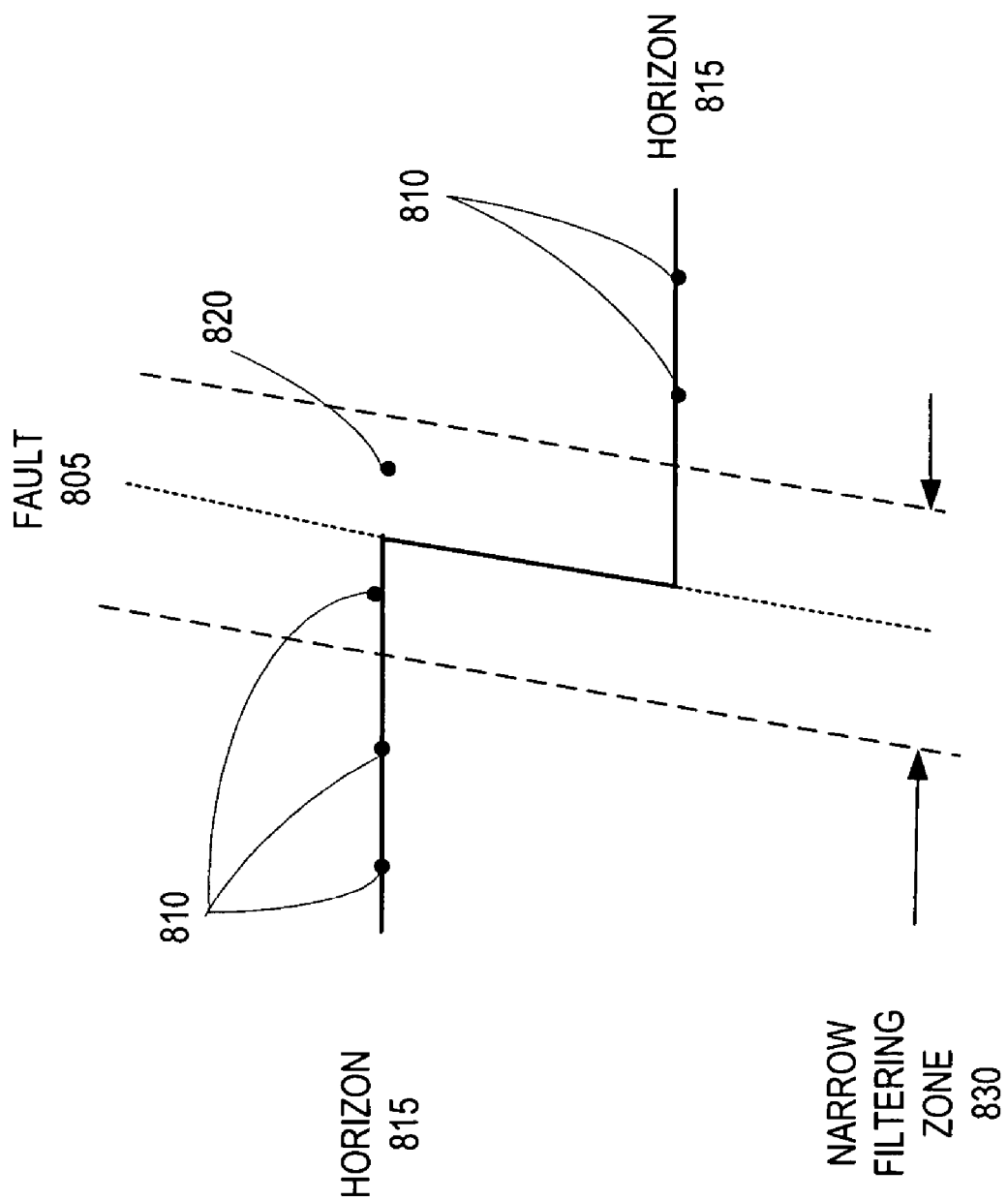
FIG. 8 illustrates filtering of data, according to an embodiment of the invention.

Referring to FIG. 8, filtering of data is illustrated, according to an embodiment. The input data points 810 may be optionally filtered with respect to the bounding surfaces of the fault block. As described earlier, the filtering may be needed to remove discrepancies between the input horizon data and the geometry of the fault blocks defined through the splitting faults described in step 510 of FIG. 5. The main source of input horizon data is typically obtained from seismic interpretation. It is well known that the interpretation tends to be inaccurate in the vicinity of faults or cracks, e.g., within a narrow filtering zone 830. Often, horizon data points are interpreted across the fault without taking into account the vertical displacement a horizon 815 undergoes at the location of the crack. If left untreated, this incorrect interpretation may lead to errors in the horizon model computed and subsequently in the model of the entire reservoir. A utility that is capable of eliminating input data points based on their distance from the fault surface may be utilized to perform the optional filtering step. The Euclidean distance from the point to the original (non extrapolated) fault surface is used. This utility can be configured to eliminate points, such as points 820, selectively on one or both sides of a particular fault 805.

Figure 9A:
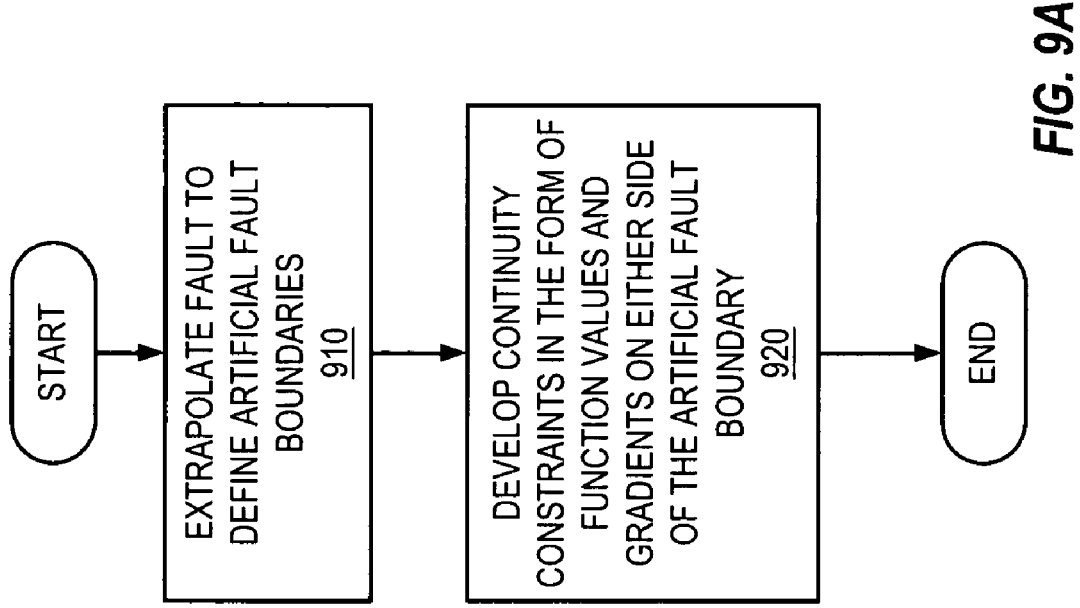
FIGS. 9A, and 9B illustrate the development of the continuity constraints, according to an embodiment of the invention.

Referring to FIG. 9A, a flow chart for the formation of patches is illustrated, according to one embodiment. In step 910, which is the same as step 710, for a given horizon, the fault boundaries are artificially extended. In step 920, continuity constraints in the form of function values and gradients are developed on either side of the artificially extended fault boundaries.

Figure 9B:
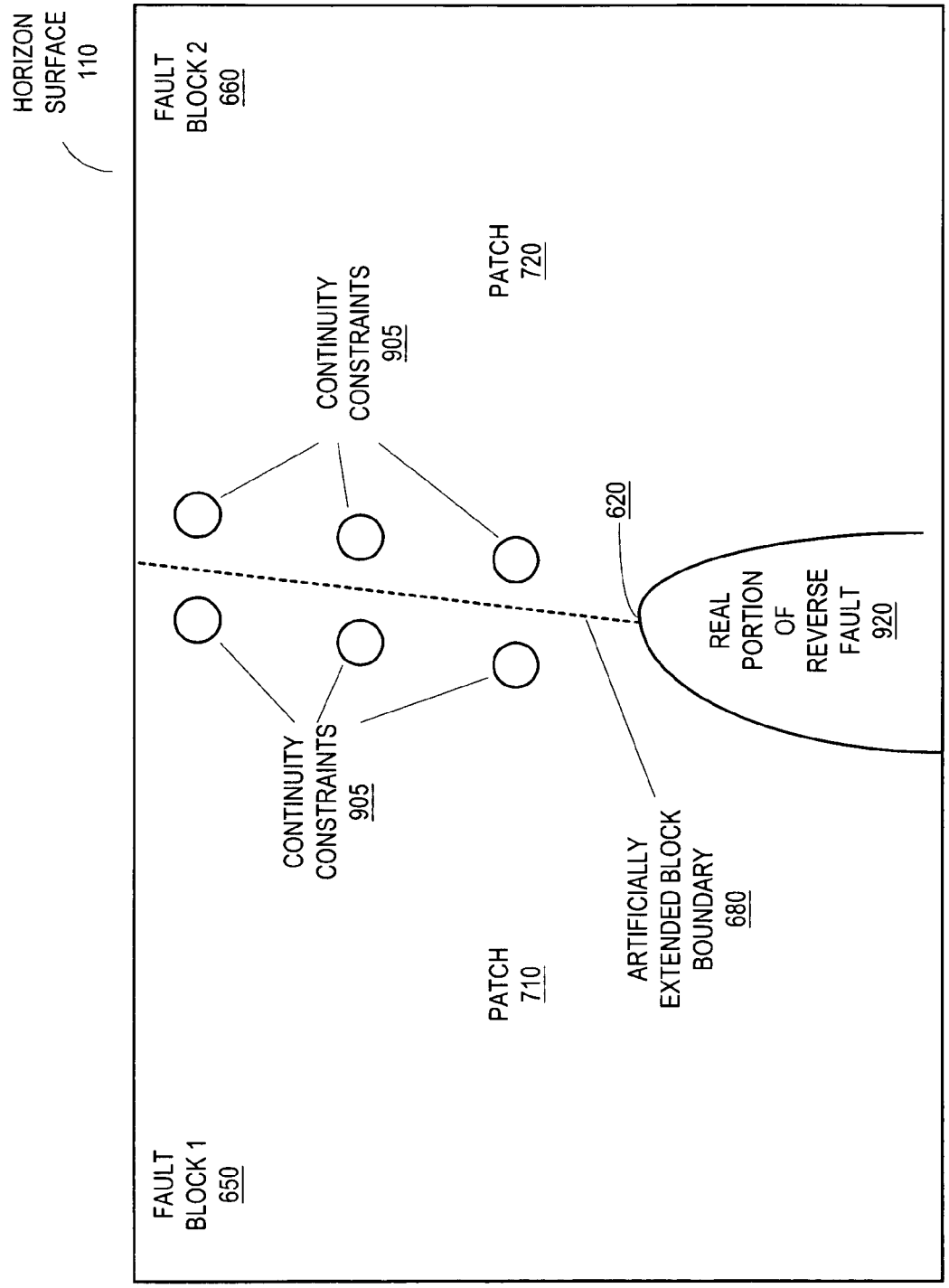

Referring to FIG. 9B, development of the continuity constraints 905 is illustrated, per step 540, according to an embodiment. Continuity constraints 905 are generally required to ensure that a horizon surface and its gradient are continuous across artificially extended fault block boundaries. Without the introduction of continuity constraints 905, the horizon patches 710 and 720 from both sides of the artificially extended block boundary 680 will be discontinuous. Such discontinuity will also lead to mismatch in the endpoints 610 and 620 of the crack opening of the horizon caused by the real portion 920 of the reverse fault 220. This will result in a low quality horizon model and lead to inaccurate modeling results in the subsequent steps of the workflow, e.g., in property modeling and flow simulation.

To address such problems, continuity constraints 905 in the form of function values and gradient are calculated and imposed along the artificial block boundary 680. If $(x_t, y_t, z_t)$ is the parameterization of the intersection of the extrapolated part of a fault F and horizon patch A and $(\hat{x}_t, \hat{y}_t, \hat{z}_t)$ is the parameterization of the intersection of the same part of F with horizon patch B on the other side of F, then the system assures that $$(x_t, y_t, z_t) = (\hat{x}_t, \hat{y}_t, \hat{z}_t) \text{ for all values of the real parameter } t.$$

In addition, let $H_A(x,y)$ and $H_B(x,y)$ be the parameterizations of horizon patches A and B, e.g., patches 520 and 530, in the vicinity of the intersection with fault F. The horizon patch in the interior of a given fault block cannot be assumed to admit a manifold (non-faulted) representation because of the assumption that the interior may include normal faults. However, the horizon surface regions between cracks can be parameterized by continuously differentiable maps H(x,y) where (x,y) belongs to some subset of the union of all $D_{Si}$(x, y). By way of construction, $H_A(x_t,y_t)=(x_t,y_t,z_t)$ for all values of the real parameter t.

Then the system assures that grad $H_A(x_t,y_t)$=grad $H_B(x_t,y_t)$ for all values of the real parameter t.

The intersections of the patch surface with the boundaries of the corresponding fault block are known as patch trim loops. They are an important element of the multi-patch horizon model. The continuity constraints 905 assure that the trim loops for two neighboring horizon patches 710 and 720 coincide over the extrapolated parts of the shared fault surfaces. However, the trim loops will diverge in the area of the real part 920 of the reverse fault 220 thus defining the fault zone 410, also known as the crack opening of the horizon caused by the fault.

Figure 10:
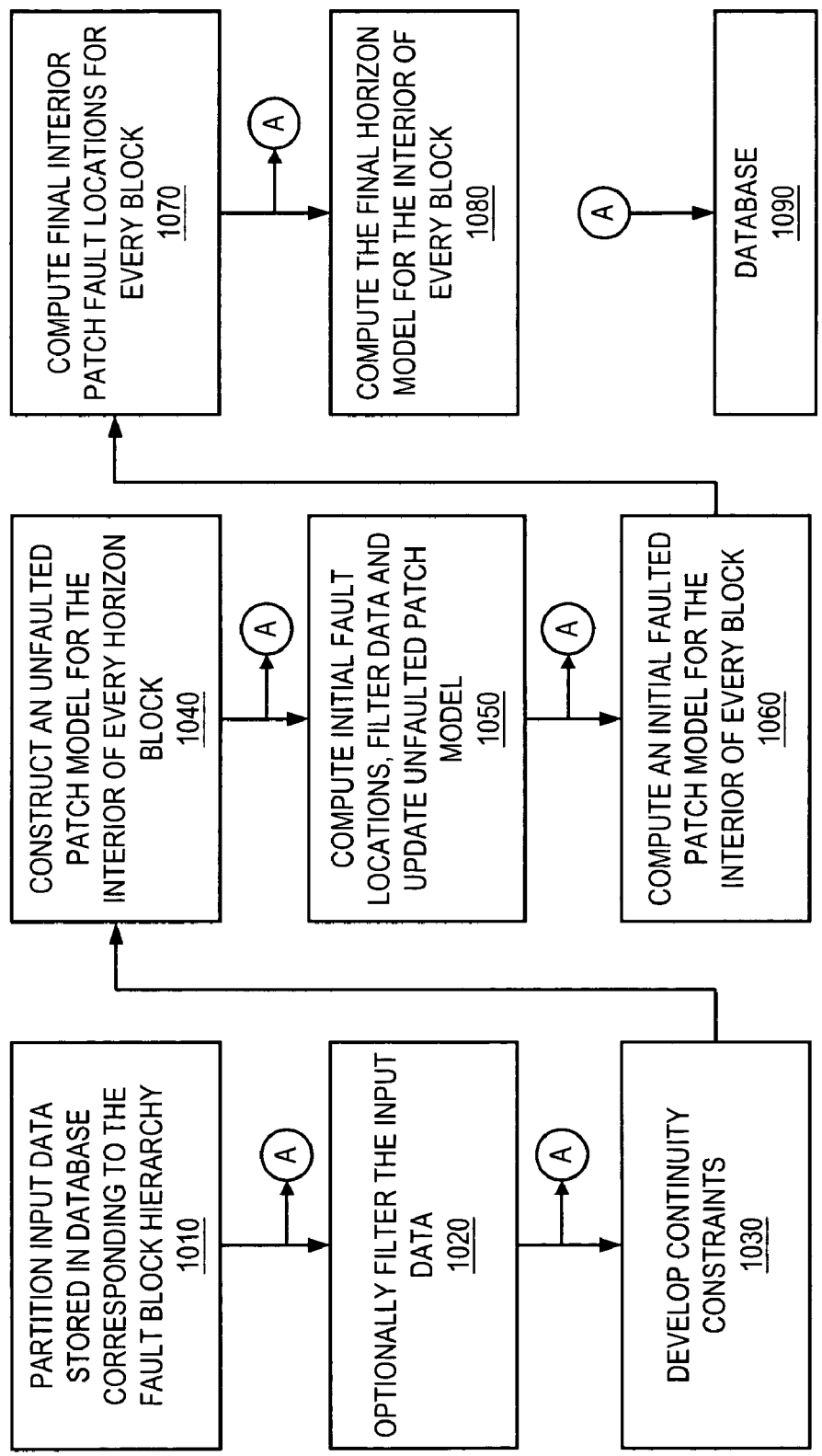
FIG. 10 illustrates a technique for developing the multi-valued horizon models, according to one embodiment of the invention.

Referring now to FIG. 10, a technique for developing the multi-valued horizon models is illustrated in a flow chart, according to one embodiment of the invention. The technique described below incorporates steps 520, 530 and 540 of FIG. 5 as steps 1010, 1020 and 1030 respectively. The subsequent steps 1040 through 1080 of the technique follow the logic of the algorithm for single valued horizon described by the U.S. patents referenced earlier but applied to the interior of the fault block only. A database 1090 that includes a representation of an earth model is optionally configured to provide input to and/or receive output from each of the steps 1010 through 1080. In one embodiment, inputs to and/or outputs from each of the steps 1010 through 1080 are stored in memory. The surface operations performed to develop the faulted patch model are restricted to the interior of the corresponding fault block by virtue of the fact that the horizon patch is undefined outside the corresponding fault block. This eliminates the need to classify the remaining faults from the framework with respect to the fault block partitioning of the reservoir.

In step 1010, partition the input data stored in the database 1090 with respect to the fault block splitting of the reservoir and define a set of patches of horizon data, with each patch corresponding to a fault block. The partitioned horizon data is stored in the database 1090.

In optional step 1020, filter the input data with respect to the bounding surfaces of the fault blocks to output filtered partitioned horizon data that is stored in the database 1090. The filtering step may be performed on the partitioned patch data to eliminate wrong-sided points or points 820 located within narrow filtering zone 830.

In step 1030, develop continuity constraints for horizon patches along artificially extended fault block boundaries to assure continuity of the surface and its gradient across these boundaries. The continuity constraints are stored in the database 1090.

In step 1040, use the patch data and the computed continuity constraints to develop a preliminary unfaulted horizon model in the interior of each block. Thus, an unfaulted patch model in the interior of every faulted block is constructed using the corresponding portion of the input data and continuity constraints. Compute also a surface patch boundary, e.g., patch trim loops, by intersecting the unfaulted patch model with the bounding surfaces of the fault block. The unfaulted patch models and initial trim loop is stored in the database 1090.

In step 1050, use the patch data, the continuity constraint data, and the patch boundary to compute initial fault locations for the interior of every patch using the algorithm described in earlier referenced U.S. patents. Thus the initial fault locations are obtained by intersecting the unfaulted patch model of step 1040 for every fault block with the fault surfaces. Then filter and adaptively increment the filtering distance for every fault location. Repeat until the maximum distortion angle for every fault location is below the threshold. Step 1050 is completed by filtering the data with respect to the initial fault locations to update the unfaulted patch model. Update the surface patch boundary, e.g., patch trim loops by computing the intersection of the unfaulted interior horizon model resulting from the initial fault location calculation with the bounding surfaces of the block. Store the initial fault locations, filtered patch data, updated unfaulted model and updated patch trim loops in the database 1090.

In step 1060, use the filtered patch data, the continuity constraint data, the surface patch boundary and the initial fault locations from Step 1050 to compute an initial faulted horizon model for the interior of every patch using the algorithm described in the earlier referenced U.S. patents. Update the patch trim loop. Store the initial faulted horizon model and updated patch trim loop in the database 1090.

In step 1070, use the initial faulted horizon model for the interior of every patch from Step 1060 to compute final fault locations for the interior faults using the algorithm described in earlier referenced U.S. patents. Store final interior patch fault locations for each fault block in the database 1090.

In step 1080, use the final interior fault locations from Step 1070, the patch data, and the continuity constraints to compute final faulted horizon model for the interior of every patch using the algorithm described in earlier referenced U.S. patents. Update the surface patch boundary by computing the intersection of the horizon model thus computed with the bounding surfaces of the block. Save final faulted patch model and updated patch trim loop in the database 1090.

The 3D horizon modeling system described above also supports conformal horizon modeling as described by earlier referenced U.S. patents. The new element here is that the conformal shaping data is derived in the context of the fault block partitioning of the reservoir, per step 510. The two main versions of conformal modeling are supported: 1) using a limited set of input data points that provide the general location of the model and a reference horizon patch model which provides the shaping, and 2) using a thickness model and a reference patch model. The thickness model can be either a global single-valued model for the entire horizon or a set of patch thickness models. A single model is useful when the geological deformations do not lead to different rock compression on both sides of a given reverse fault. The patch thickness models are useful when the geological deformations cause different rock compression across a reverse fault. Obviously, this phenomenon cannot be represented accurately with a single valued thickness model. Subsequently, a multi-patched model is well suited for such applications.

The combination of thickness and reference models is useful in computing a horizon model with specific desired properties. However, the definition of a good thickness model may be difficult. The system allows the user to start with approach 1) from above. The thickness models are computed as a byproduct of the modeling process. Once this is completed, the user of the system can modify the thickness models as desired and use approach 2) from above.

Figure 11:
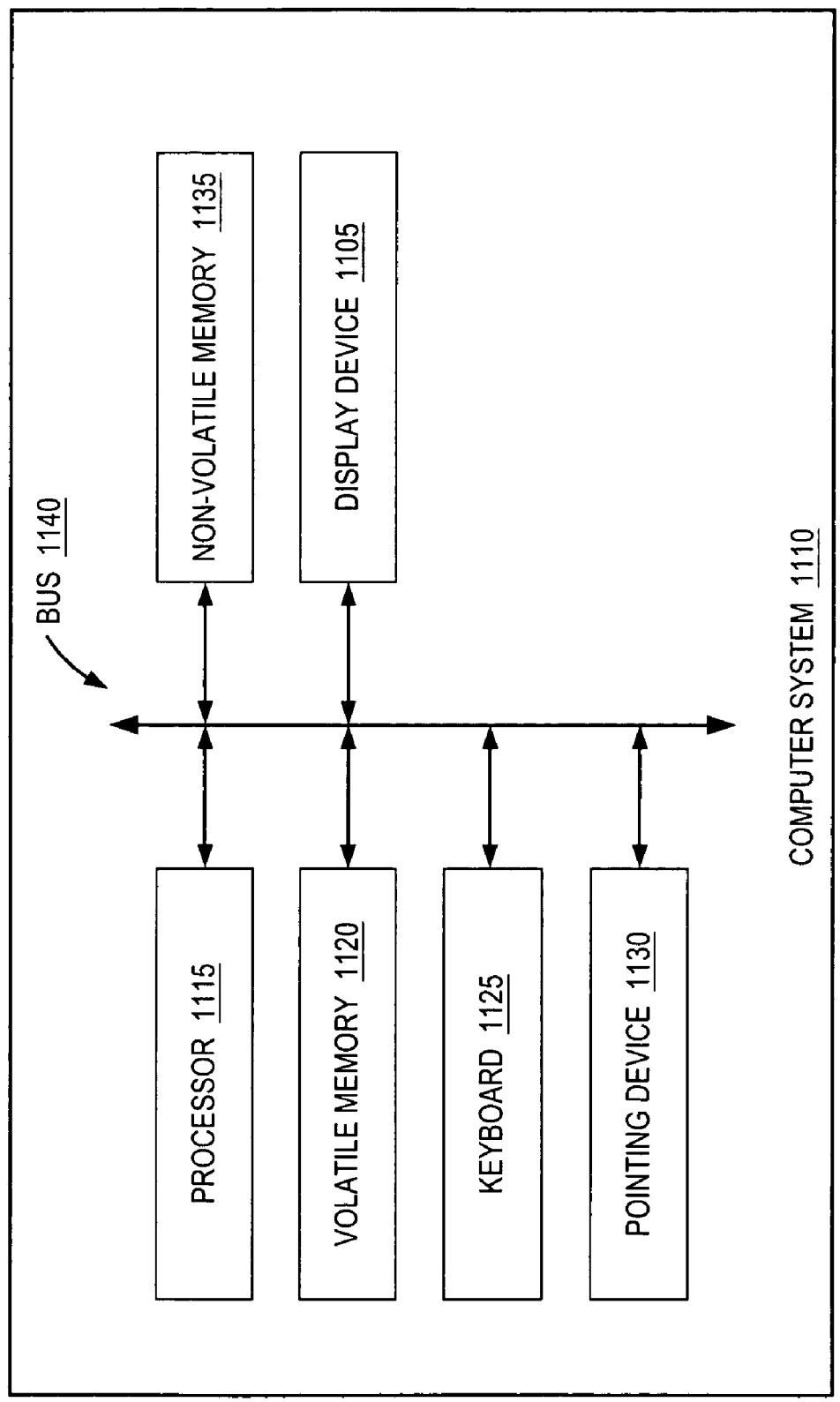
FIG. 11 illustrates a block diagram of a computer system to implement method or apparatus aspects of the present invention, according to an embodiment of the invention.

Referring now to FIG. 11, a computer system 1110 is shown that is generally applicable for the various embodiments described. The system 1110 includes a processor 1115, a volatile memory 1120, e.g., RAM, a keyboard 1125, a pointing device 1130, e.g., a mouse, a nonvolatile memory 1135, e.g., ROM, hard disk, floppy disk, CD-ROM, and DVD, and a display device 1105 having a display screen. Memory 1120 and 1135 are for storing program instructions, which are executable by processor 1115 to implement various embodiments of a method in accordance with the present invention. The memory 1120 and 1135 may be used to store portions of the database 1090. Components included in system 1110 are interconnected by bus 1140. A communications device (not shown) may also be connected to bus 1140 to enable information exchange between system 1110 and other devices such as other computer systems via a network such as the Internet.

In various embodiments system 1110 takes a variety of forms, including a personal computer system, client/server system, mainframe computer system, parallel processing computer system, workstation, Internet appliance, PDA, an embedded processor with memory, etc. That is, it should be understood that the term "computer system" is intended to encompass any device having a processor that executes instructions from a memory medium.

The memory medium preferably stores instructions (also known as a "software program") for implementing various embodiments of a method in accordance with the present invention. In various embodiments the one or more software programs are implemented in various ways, including procedure-based techniques, component-based techniques, and/or object-oriented techniques, among others. Specific examples include XML, C, C++, Java and Microsoft Foundation Classes (MFC).

Figure 12:
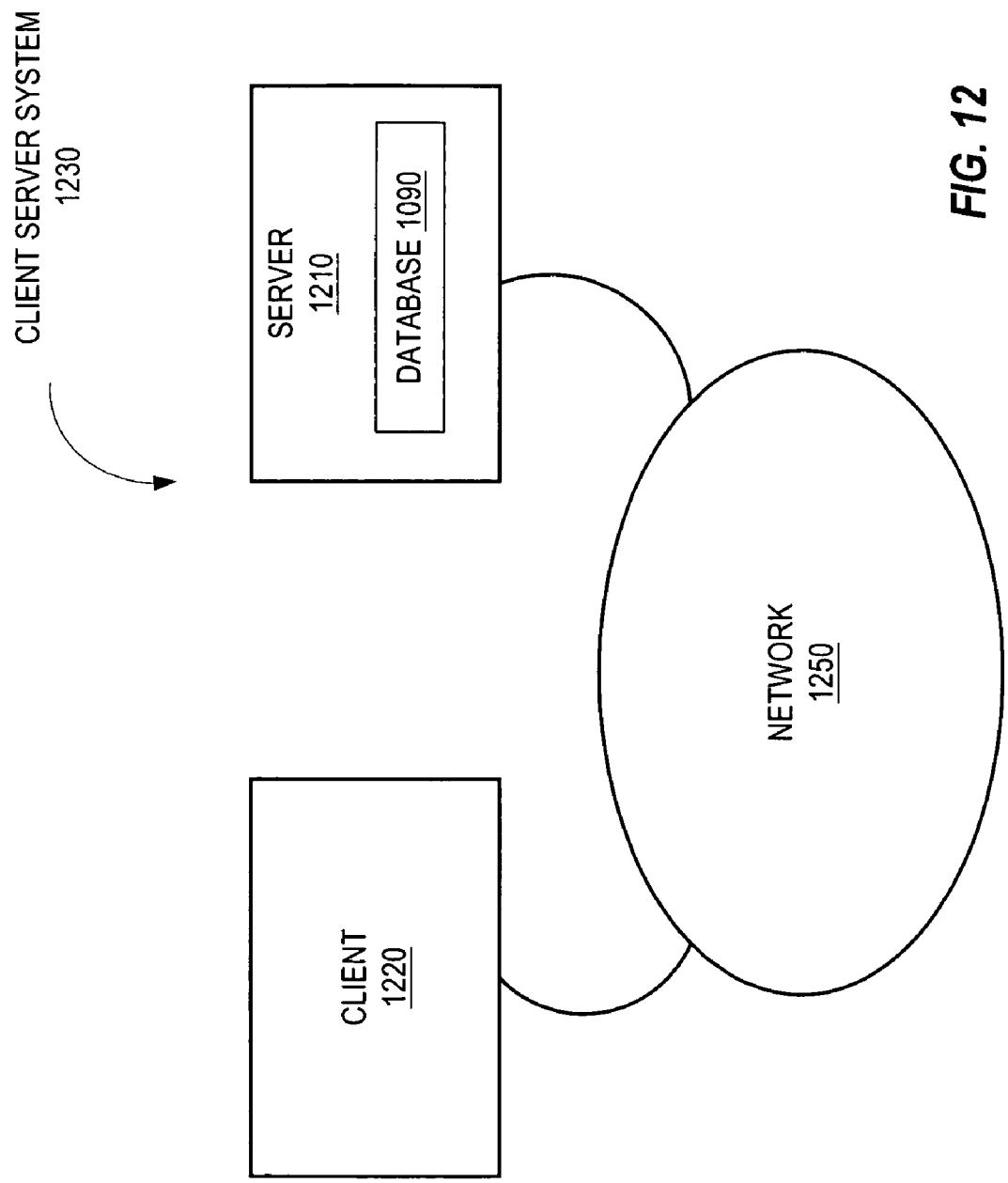
FIG. 12 illustrates a block diagram of a client-server computer system, according to an embodiment of the present invention.

Referring to FIG. 12, a client-server computer system 1230 is used to implement an embodiment of the present invention. The system models multi-valued horizon models in the context of an earth model, where the complexities of the various model elements of reverse faulted structures are hidden underneath simple handles to components of the earth model stored on the database 1090. One software design paradigm that can be applied effectively here is the client-server model. The server 1210 is responsible for maintaining the database 1090 storage and servicing requests for data access and storage. The server 1210 is the gateway to the common repository. The various components (e.g. faults, horizons, etc) of the reservoir 115 are represented in the database 1090 and the data for each one of them is stored using a particular data model. The server 1210 knows and enforces the relationships between the different data model components. The earth model data is available to one or more client 1220 computer workstations that can interact with it via a network 1250. The client 1220 workstation is executing a computer program working with a particular part of the earth model and can react to changes of the model made by another client through the database server 1210. This description is based on the disclosure of U.S. patent application Ser. No. 08/758,833, by Shamim Ahmed and Serge Dacic, and is incorporated herein by reference. The computing technique outlined provides opportunities for modular software design and application integration. For example, the horizon modeling functionality described in this disclosure can be developed into an application capable of interacting with the earth model through the client-server system 1230. It takes the data for a horizon, the fault framework and surfaces, and the fault block partitioning, per step 510, and computes and deposits the model into the earth model. A complimentary visualization application can be developed in a similar fashion. It, for example, can display on the display device 1105 the computed horizon model as well as any of its inputs model. Both applications will communicate through the common earth model deposited onto the database 1090 and express interest events dispatched from one application to the other via the server 1210.

Figure 13:
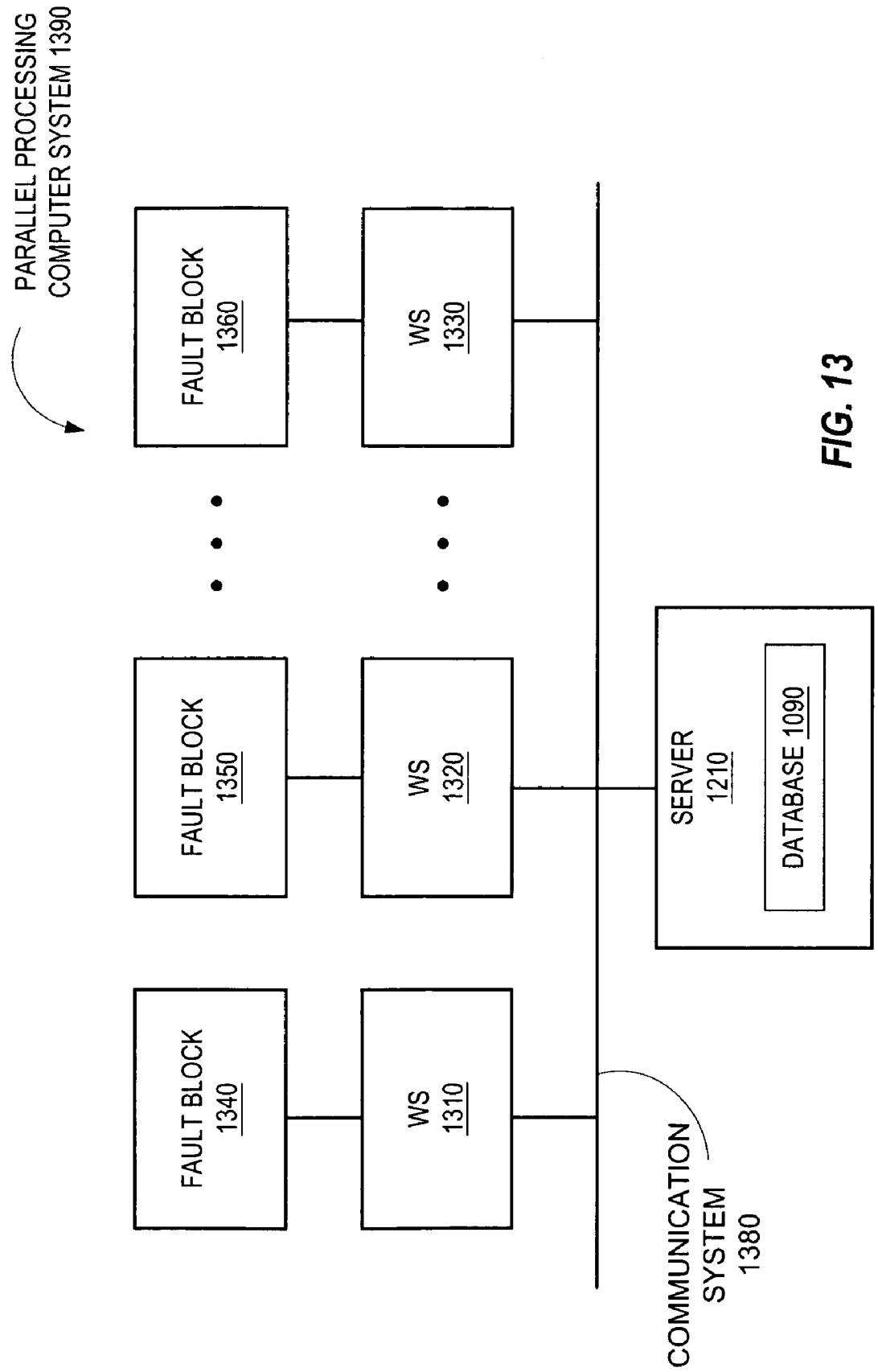
FIG. 13 illustrates a block diagram of a parallel processing computer system, according to an embodiment of the present invention.

Referring to FIG. 13, a parallel processing computer system 1390 including workstations 1310, 1320 and 1330 is used to implement one embodiment of the present invention. The technique described in FIG. 10 is well suited for parallel computation. The task of computing the horizon model components for every fault block, e.g., 1340, 1350 and 1360 is delegated to a different workstation. Step 1010 from this algorithm can be computed on a single workstation. After that, each workstation will execute steps 1020-1080 from these algorithms and store the results into the database 1090. In this manner, the amount of time required to compute the full model will be advantageously reduced. In addition, much larger models can be computed with this technique. The need to synchronize between the computing workstations executing the computing steps 1020-1080 is reduced, since the steps 1020-1080 are independent of each other and can be executed in parallel. Each workstation is able to communicate with any other workstation, and the database 1090 coupled to server 1210 via a communication system 1380. Server 1210 being a common resource for the computing workstations 1310, 1320 and 1330, may be experience increased load. However, the ratio between I/O and compute cycles for the algorithms from FIG. 10 is in favor of the computing time. Therefore, the common link with the database 1090 is not a serious bottleneck for the performance of the parallel processing system.

The description of the present embodiment has been presented for purposes of illustration, but is not intended to be exhaustive or to limit the invention to the form disclosed. Many modifications and variations will be apparent to those of ordinary skill in the art. To reiterate, the embodiments were chosen and described in order to best explain the principles of the invention, the practical application, and to enable others of ordinary skill in the art to understand the invention. Various other embodiments having various modifications may be suited to a particular use contemplated, but may be within the scope of the present invention. Those of ordinary skill in the art will appreciate that the hardware and methods illustrated herein may vary depending on the implementation.

Additionally, it is important to note that while the present invention has been described in the context of a computer system having a processor and memory, those of ordinary skill in the art will appreciate that the processes of the present invention are capable of being distributed as computer readable medium of instructions in a variety of forms and that the present invention applies equally regardless of the particular type of signal bearing media actually used to carry out the distribution. Examples of computer readable media include recordable-type media such a floppy disc, a hard disk drive, a RAM, CD-ROM, CD-RW, DVD and transmission-type media such as digital and analog communications links.

To reiterate, many additional aspects, modifications and variations are also contemplated and are intended to be encompassed within the scope of the following claims. Moreover, it should be understood that in the following claims, actions are not necessarily performed in the particular sequence in which they are set out.

I claim:

1. A method of modeling a reservoir having a horizon surface with a reverse fault, the method comprising:
   a) partitioning a volume of the reservoir into fault blocks, wherein a bounding surface of each of the fault blocks includes a portion of the reverse fault, wherein an interior of each of the fault blocks includes only single valued horizon surfaces;

b) partitioning horizon data describing the reservoir into data sets, the data sets defining patches, wherein each patch corresponds to a fault block, wherein the patches include an up-thrown and down-thrown fault trace on opposing sides of the reverse fault;

c) developing continuity constraints along artificially extended fault block boundaries, wherein the continuity constraints match endpoints of the up-thrown and down-thrown fault trace; and d) storing the continuity constraints.

2. The method of claim 1, further comprising artificially extending fault surfaces of the reverse fault to a boundary of the volume.

3. The method of claim 1, wherein the fault blocks are formed by artificially extending fault surfaces of the reverse fault to an intersection of another horizon with another fault.

4. The method of claim 1, wherein each data point included in the horizon data is assigned to only one fault block included in the fault blocks.

5. The method of claim 1, further comprising selecting a subset of all faults in the reservoir, the subset including the reverse fault.

6. The method of claim 1, comprising:
computing an initial unfaulted horizon model in the interior of each fault block in response to receiving patch data, and data describing the continuity constraints; and
computing a surface patch boundary by intersecting the initial unfaulted horizon model with the bounding surfaces of the fault block.

7. The method of claim 6, comprising:
computing initial fault locations for the interior of each patch in response to receiving the patch data, the continuity constraint data and the surface patch boundary; and
updating the surface patch boundary by intersecting the initial unfaulted horizon model with the bounding surfaces of the fault block.

8. The method of claim 7, comprising:
computing an initial faulted model for the interior of each fault patch in response to receiving the patch data, the continuity constraint data, the surface patch boundary and the initial fault locations.

9. The method of claim 8, comprising:
computing final fault locations for interior faults in response to the initial faulted model for the interior of each fault patch.

10. The method of claim 9, comprising:
computing a final faulted model for the interior of each fault patch in response to receiving the final fault locations, the patch data, and the continuity constraint data; and
updating the surface patch boundary by intersecting the final faulted horizon model with the bounding surfaces of the fault block.

11. The method of claim 1, comprising:
filtering the horizon data to eliminate wrong sided data points, the filtering being optionally performed prior to developing the continuity constraints.

12. The method of claim 1, wherein the modeling defines a model for the reservoir, wherein the model is adapted for receiving the horizon data and fault surfaces and relationships data.

13. A method of modeling a reservoir having a horizon surface with reverse faults, the method comprising:

a) partitioning a volume of the reservoir into fault blocks, wherein the fault blocks are partitioned using a subset of all faults in the reservoir;

b) partitioning horizon data describing the reservoir into data sets, the data sets defining patches, wherein each patch corresponds to a fault block, wherein the patches include an up-thrown and down-thrown fault trace on opposing sides of a reverse fault included in the subset; and c) developing continuity constraints along artificially extended fault block boundaries, wherein the continuity constraints match endpoints of the up-thrown and down-thrown fault trace; and d) storing the continuity constraints.

14. The method of claim 13, wherein the subset includes all the reverse faults.

15. The method of claim 13, wherein each reverse fault is included in a bounding surface of at least one of the fault blocks.

16. The method of claim 13, wherein an interior of each of the fault blocks includes only single valued horizon surfaces.

17. The method of claim 13, wherein the modeling defines a model for the reservoir, wherein the model is adapted for receiving the horizon data and fault surfaces and relationships data.

18. The method of claim 13, further comprising artificially extending fault surfaces of each of the reverse faults to a boundary of the volume.

19. The method of claim 13, wherein the fault blocks are formed by artificially extending fault surfaces of each of the reverse faults to an intersection of another horizon with another fault.

20. The method of claim 13, wherein each data point included in the horizon data is assigned to only one fault block included in the fault blocks.

21. The method of claim 13, comprising:
computing an initial unfaulted horizon model in the interior of each fault block in response to receiving patch data, and data describing the continuity constraints; and
computing a surface patch boundary by intersecting the initial unfaulted horizon model with the bounding surfaces of the fault block.

22. The method of claim 21, comprising:
computing initial fault locations for the interior of each patch in response to receiving the patch data, the continuity constraint data and the surface patch boundary; and
updating the surface patch boundary by intersecting the initial unfaulted horizon model with the bounding surfaces of the fault block.

23. The method of claim 22, comprising:
computing an initial faulted model for the interior of each fault patch in response to receiving the patch data, the continuity constraint data, the surface patch boundary and the initial fault locations.

24. The method of claim 23, comprising:
computing final fault locations for interior faults in response to the initial faulted model for the interior of each fault patch.

25. The method of claim 24, comprising:
computing a final faulted model for the interior of each fault patch in response to receiving the final fault locations, the patch data, and the continuity constraint data; and
updating the surface patch boundary by intersecting the final faulted horizon model with the bounding surfaces of the fault block.

26. The method of claim 13, comprising:
filtering the horizon data to eliminate wrong sided data points, the filtering being optionally performed prior to developing the continuity constraints.

27. A computer system for developing a model for a reservoir having a horizon surface with a reverse fault, the computer system comprising:
a) a processor;
b) a memory;
c) means for partitioning a volume of the reservoir into fault blocks, wherein a bounding surface of each of the fault blocks includes a portion of the reverse fault, wherein an interior of each of the fault blocks includes only single valued horizon surfaces;
d) means for partitioning horizon data describing the reservoir into data sets, the data sets defining patches, wherein each patch corresponds to a fault block, wherein the patches include an up-thrown and down-thrown fault trace on opposing sides of the reverse fault; and
e) means for developing continuity constraints along artificially extended fault block boundaries, wherein the continuity constraints match endpoints of the up-thrown and down-thrown fault trace; and
d) storage means for storing the continuity constraints.

28. The computer system of claim 27, further comprising means for artificially extending fault surfaces of the reverse fault to a boundary of the volume.

29. The computer system of claim 27, wherein the fault blocks are formed by artificially extending fault surfaces of the reverse fault to an intersection of another horizon with another fault.

30. The computer system of claim 27, wherein each data point included in the horizon data is assigned to only one fault block included in the fault blocks.

31. The computer system of claim 27, further comprising means for selecting a subset of all faults in the reservoir, the subset including the reverse fault.

32. The computer system of claim 27, further comprising:
means for computing an initial unfaulted horizon model in the interior of each fault block in response to receiving patch data, and data describing the continuity constraints; and
means for computing a surface patch boundary by intersecting the initial unfaulted horizon model with the bounding surfaces of the fault block.

33. The computer system of claim 32, further comprising:
means for computing initial fault locations for the interior of each patch in response to receiving the patch data, the continuity constraint data and the surface patch boundary; and
means for updating the surface patch boundary by intersecting the initial unfaulted horizon model with the bounding surfaces of the fault block.

34. The computer system of claim 33, further comprising:
means for computing an initial faulted model for the interior of each fault patch in response to receiving the patch data, the continuity constraint data, the surface patch boundary and the initial fault locations.

35. The computer system of claim 34, further comprising:
means for computing final fault locations for interior faults in response to the initial faulted model for the interior of each fault patch.

36. The computer system of claim 35, further comprising:
means for computing a final faulted model for the interior of each fault patch in response to receiving the final fault locations, the patch data, and the continuity constraint data; and means for updating the surface patch boundary by intersecting the final faulted horizon model with the bounding surfaces of the fault block.

37. The computer system of claim 27, further comprising:
means for filtering the horizon data to eliminate wrong sided data points, the filtering being optionally performed prior to developing the continuity constraints.

38. The computer system of claim 27, wherein the modeling defines a model for the reservoir, wherein the model is adapted for receiving the horizon data and fault surfaces and relationships data.

39. An automated fault surface based horizon modeling system to receive horizon data and fault surfaces and relationships data and to allow a faulted horizon model to be defined in the presence of at least one multi-valued horizon surface caused by a reverse fault, comprising:
a processor;
a memory;
initial unfaulted horizon model determination means for determining and generating an initial unfaulted horizon model, the initial unfaulted horizon model including the at least one multi-valued horizon surface, wherein the at least one multi-valued horizon surface includes one or more accurately represented intersections and a plurality of faults passing, respectively, through said one or more intersections whereby underground deposits of hydrocarbon are potentially located adjacent each of said intersections, the initial unfaulted horizon determination means including,
fault block determination means responsive to the horizon data and the fault surfaces and relationships data for partitioning a volume of the underground deposits into a plurality of fault blocks, wherein a boundary of each of the plurality of fault blocks includes a portion of the reverse fault,
horizon data determination means responsive to the plurality of fault blocks for partitioning the horizon data into data sets, the data sets defining patches, wherein each patch corresponds to a fault block, and
continuity constraints determination means responsive to the plurality of patches for defining continuity constraints to match endpoints of an up-thrown and down-thrown trace of the at least one reverse fault, and
storage means for storing the continuity constraints.

40. A modeling system operable to provide a representation of a reservoir having a horizon surface with a reverse fault, the system comprising:
a processor; and
a memory storing instructions which when executed by the processor, enables the processor to perform the steps of:
a) partitioning a volume of the reservoir into fault blocks, wherein a bounding surface of each of the fault blocks includes a portion of the reverse fault, wherein an interior of each of the fault blocks includes only single valued horizon surfaces;
b) partitioning horizon data describing the reservoir into data sets, the data sets defining patches, wherein each patch corresponds to a fault block, wherein the patches include an up-thrown and down-thrown fault trace on opposing sides of the reverse fault; and
c) developing continuity constraints along artificially extended fault block boundaries, wherein the continuity constraints match endpoints of the up-thrown and down-thrown fault trace; and d) storing the continuity constraints.

41. The modeling system of claim 40, wherein the instructions being further executed for artificially extending fault surfaces of the reverse fault to a boundary of the volume.

42. The modeling system of claim 40, wherein the fault blocks are formed by artificially extending fault surfaces of the reverse fault to an intersection of another horizon with another fault.

43. The modeling system of claim 40, wherein each data point included in the horizon data is assigned to only one fault block included in the fault blocks.

44. The modeling system of claim 40, wherein the instructions being further executed for selecting a subset of all faults in the reservoir, the subset including the reverse fault.

45. The modeling system of claim 40, wherein the instructions being further executed for:

computing an initial unfaulted horizon model in the interior of each fault block in response to receiving patch data, and data describing the continuity constraints; and computing a surface patch boundary by intersecting the initial unfaulted horizon model with the bounding surfaces of the fault block.

46. The modeling system of claim 45, wherein the instructions being further executed for:

computing initial fault locations for the interior of each patch in response to receiving the patch data, the continuity constraint data and the surface patch boundary; and updating the surface patch boundary by intersecting the initial unfaulted horizon model with the bounding surfaces of the fault block.

47. The modeling system of claim 46, wherein the instructions being further executed for:

computing an initial faulted model for the interior of each fault patch in response to receiving the patch data, the continuity constraint data, the surface patch boundary and the initial fault locations.

48. The modeling system of claim 47, wherein the instructions being further executed for:

computing final fault locations for interior faults in response to the initial faulted model for the interior of each fault patch.

49. The modeling system of claim 48, wherein the instructions being further executed for:

computing a final faulted model for the interior of each fault patch in response to receiving the final fault locations, the patch data, and the continuity constraint data; and updating the surface patch boundary by intersecting the final faulted horizon model with the bounding surfaces of the fault block.

50. The modeling system of claim 40, wherein the instructions being further executed for:

filtering the horizon data to eliminate wrong sided data points, the filtering being optionally performed prior to developing the continuity constraints.

51. The modeling system of claim 40, wherein the modeling system defines a model for the reservoir, wherein the model is adapted for receiving the horizon data and fault surfaces and relationships data.

52. A computer recordable medium, embodying instructions executable by the computer to perform method steps for a modeling system operable to provide a representation of a reservoir having a horizon surface with a reverse fault, the computer recordable medium comprising:

instructions for partitioning a volume of the reservoir into a plurality of fault blocks, wherein a bounding surface of each of the plurality of fault blocks includes a portion of the reverse fault, wherein each of the plurality of fault blocks has an interior described by a corresponding single valued horizon model;

instructions for partitioning horizon data describing the reservoir into data sets, the data sets defining patches, wherein each patch corresponds to a fault block;

instructions for developing continuity constraints along artificially extended fault block boundaries, wherein the continuity constraints result in matching endpoints of an up-thrown and down-thrown trace of the reverse fault; and instructions for storing the continuity constraints.

53. The computer recordable medium of claim 52, further comprising instructions for artificially extending fault surfaces of the reverse fault to a boundary of the volume.

54. The computer recordable medium of claim 52, wherein the fault blocks are formed by artificially extending fault surfaces of the reverse fault to an intersection of another horizon with another fault.

55. The computer recordable medium of claim 52, wherein each data point included in the horizon data is assigned to only one fault block included in the fault blocks.

56. The computer recordable medium of claim 52, further comprising instructions for selecting a subset of all faults in the reservoir, the subset including the reverse fault.

57. The computer recordable medium of claim 52, further comprising:

instructions for computing an initial unfaulted horizon model in the interior of each fault block in response to receiving patch data, and data describing the continuity constraints; and instructions for computing a surface patch boundary by intersecting the initial unfaulted horizon model with the bounding surfaces of the fault block.

58. The computer recordable medium of claim 57, further comprising:

instructions for computing initial fault locations for the interior of each patch in response to receiving the patch data, the continuity constraint data and the surface patch boundary; and instructions for updating the surface patch boundary by intersecting the initial unfaulted horizon model with the bounding surfaces of the fault block.

59. The computer recordable medium of claim 58, further comprising:

instructions for computing an initial faulted model for the interior of each fault patch in response to receiving the patch data, the continuity constraint data, the surface patch boundary and the initial fault locations.

60. The computer recordable medium of claim 59, further comprising:

instructions for computing final fault locations for interior faults in response to the initial faulted model for the interior of each fault patch.

61. The computer recordable medium of claim 60, further comprising:

instructions for computing a final faulted model for the interior of each fault patch in response to receiving the final fault locations, the patch data, and the continuity constraint data; and instructions for updating the surface patch boundary by intersecting the final faulted horizon model with the bounding surfaces of the fault block.

62. The computer recordable medium of claim 52, further comprising:
instructions for filtering the horizon data to eliminate wrong sided data points, the filtering being optionally performed prior to developing the continuity constraints.

63. The computer recordable medium of claim 52, wherein the modeling defines a model for the reservoir, wherein the model is adapted for receiving the horizon data and fault surfaces and relationships data.

64. An automated fault surface based horizon modeling system to receive horizon data and fault surfaces and relationships data and to allow a faulted horizon model to be defined in the presence of at least one multi-valued horizon surface caused by a reverse fault, comprising:
a processor;
a memory;
initial unfaulted horizon model determination apparatus for determining and generating an initial unfaulted horizon model, the initial unfaulted horizon model including the at least one multi-valued horizon surface, wherein the at least one multi-valued horizon surface includes one or more accurately represented intersections and a plurality of faults passing, respectively, through said one or more intersections whereby underground deposits of hydrocarbon are potentially located adjacent each of said intersections, the initial unfaulted horizon determination apparatus including,
fault block determination apparatus responsive to the horizon data and the fault surfaces and relationships data for partitioning a volume of the underground deposits into a plurality of fault blocks, wherein a boundary of each of the plurality of fault blocks includes a portion of the reverse fault, wherein an interior of each of the plurality of fault blocks includes only single valued horizon surfaces,
horizon data determination apparatus responsive to the plurality of fault blocks for partitioning the horizon data into data sets, the data sets defining patches, wherein each patch corresponds to a fault block, and
continuity constraints determination apparatus responsive to the plurality of patches for defining continuity constraints to match endpoints of an up-thrown and down-thrown trace of the at least one reverse fault, and
storage for storing the continuity constraints.

65. The horizon modeling system of claim 64 comprising:
final faulted horizon model determination apparatus for determining and generating a final faulted horizon model, said final faulted horizon model including one or more reference horizon surfaces and one or more conformal horizon surfaces associated with each of said one or more reference horizon surfaces, said final faulted horizon model determination apparatus responsive to said initial unfaulted horizon model, said final faulted horizon model determination apparatus including,
reference horizon determination apparatus responsive to said horizon data and said fault surfaces and relationships data for modeling and determining a final faulted reference horizon model for each of said one or more reference horizon surfaces, and
conformal horizon determination means responsive to said final faulted reference horizon model and responsive to at least some of said horizon data and to said fault surfaces and relationships data for modeling and determining at least one conformal horizon model for each of said final faulted reference horizon models determined by the reference horizon determination apparatus and thereby determining said final faulted horizon model,
said reference horizon determination apparatus including filter means for filtering said horizon data in the vicinity of at least some of said intersections which exhibit geometric characteristics not in good agreement with the geometric characteristics of the corresponding faults passing through said intersections.

* * * * *